United States Patent
Wolkowicki et al.

(10) Patent No.: US 10,743,255 B2
(45) Date of Patent: Aug. 11, 2020

(54) POWER OPTIMIZATION MODES FOR COMMUNICATION BETWEEN DEVICE AND SERVER

(71) Applicant: Apple Inc., Cupertino, CA (US)

(72) Inventors: Ziv Wolkowicki, Cupertino, CA (US); Daniel B. Pollack, San Francisco, CA (US); Justin Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 14/341,562

(22) Filed: Jul. 25, 2014

(65) Prior Publication Data

US 2016/0029311 A1 Jan. 28, 2016

(51) Int. Cl.
*H04W 52/02* (2009.01)

(52) U.S. Cl.
CPC ... *H04W 52/0216* (2013.01); *H04W 52/0251* (2013.01); *Y02D 70/00* (2018.01);
(Continued)

(58) Field of Classification Search
CPC ... H04W 52/00; H04W 68/00; H04W 52/287; H04W 72/1205; H04W 52/0216; H04W 52/0251; H04W 52/0274; H04W 76/048; H04W 52/02; H04W 52/0225; H04W 88/06; H04M 1/73; H04B 1/1615; Y02B 60/50; Y02D 70/00; Y02D 70/1242; Y02D 70/1262; Y02D 70/144; Y02D 70/164;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Luat Phung
*Assistant Examiner* — Thomas R Cairns
(74) *Attorney, Agent, or Firm* — Morgan, Lewis & Bockius LLP

(57) ABSTRACT

Power optimization modes for communication between a device and a server is disclosed. The device can dynamically change between communication modes based on an application or quality of service, battery life, an amount of noise associated with the communications link, a frequency of messages, and a type of message received in a given time period. In some examples, the device can determine if the number of pull messages is greater than the number of push messages. The device can select a push mode where a pull message can accompany a push message. In some examples, the device can determine that the number of push messages is greater than the number of pull messages, and the device can select a low-power associated sleep mode.

23 Claims, 11 Drawing Sheets

(52) U.S. Cl.
CPC ...... *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/23* (2018.01); *Y02D 70/26* (2018.01)

(58) Field of Classification Search
CPC ...... Y02D 70/166; Y02D 70/23; Y02D 70/26; Y02D 70/142; Y02D 70/146
USPC .......................................................... 370/311
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,881,055 A * | 3/1999 | Kondo ................ | H04B 1/1615 370/311 |
| 6,023,722 A * | 2/2000 | Colyer .................... | H04L 29/06 709/201 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,816,977 B2 * | 11/2004 | Brakmo ................ | G06F 1/3203 713/300 |
| 7,015,894 B2 | 3/2006 | Morohoshi | |
| 7,130,664 B1 | 10/2006 | Williams | |
| 7,174,161 B2 * | 2/2007 | Nakajima ............ | H04B 1/1615 380/247 |
| 7,184,064 B2 | 2/2007 | Zimmerman et al. | |
| 7,663,607 B2 | 2/2010 | Hotelling et al. | |
| 7,715,855 B2 * | 5/2010 | Subrahmanya ....... | H04W 68/00 455/414.1 |
| 7,949,377 B2 * | 5/2011 | Islam ................ | H04W 52/0251 455/154.1 |
| 8,102,790 B1 * | 1/2012 | Trehus .............. | H04W 52/0216 370/311 |
| 8,225,323 B2 * | 7/2012 | Nakao ................... | G06F 1/3203 713/1 |
| 8,479,122 B2 | 7/2013 | Hotelling et al. | |
| 8,547,941 B2 * | 10/2013 | He ......................... | H04L 47/14 370/311 |
| 8,904,206 B2 * | 12/2014 | Black ................. | H04W 52/0258 713/300 |
| 9,037,485 B2 * | 5/2015 | Fu .......................... | H04L 51/04 705/14.66 |
| 2006/0197753 A1 | 9/2006 | Hotelling | |
| 2007/0264948 A1 * | 11/2007 | Jansson ................ | G06F 1/3203 455/127.5 |
| 2009/0305732 A1 * | 12/2009 | Marcellino ........... | H04L 12/587 455/466 |
| 2010/0159948 A1 | 6/2010 | Spivey et al. | |
| 2012/0182143 A1 | 7/2012 | Gaines et al. | |
| 2013/0084914 A1 | 4/2013 | Wu et al. | |
| 2013/0190032 A1 * | 7/2013 | Li ........................... | H04L 67/28 455/517 |
| 2014/0153457 A1 * | 6/2014 | Liu .................. | H04W 52/0222 370/311 |
| 2015/0286391 A1 * | 10/2015 | Jacobs ................ | G06F 3/04847 715/771 |
| 2016/0316500 A1 | 10/2016 | Aliyar | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

POWER OPTIMIZATION MODES FOR COMMUNICATION BETWEEN DEVICE AND SERVER

FIELD OF THE DISCLOSURE

This relates generally to wireless communication between a portable electronic device and a server, and more particularly to power optimization modes for data delivery between portable electronic device and server.

BACKGROUND OF THE DISCLOSURE

A portable electronic device can include a networking subsystem and an antenna used to communicate with a server or wireless access point. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard), and/or another type of wireless interface. In order to reduce power consumption when there is no information being wirelessly communicated, these electronic devices can transition the networking subsystem to a standby mode.

The networking subsystem can routinely re-synchronize its radio clock with the clock of the server by periodically waking up its networking subsystem and antenna (i.e., switching from a standby mode to an active mode) to receive a beacon with synchronization information (such as a timestamp) at beacon transmission times. Additionally, the networking subsystem can check a Traffic Indication Map (TIM) element for data for the electronic device that is buffered on the server. Based on the power optimization mode or communication method, the networking subsystem can consume a significant amount of power in the standby mode and/or the active mode, reducing the battery life and operating time of the electronic device.

SUMMARY

This relates to power optimization modes for communication between a device and a server. Different communication modes for sending data or messages through a communications link established between device and server can consume different amounts of power depending on the frequency and type of messages received and the amount of noise associated with the communications link. The device can dynamically change between communication modes based on an application or quality of service, battery life, an amount of noise associated with the communications link, a frequency of messages, and a type of message received in a given time period.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This relates to power optimization modes for communication between a device and a server. Different communication modes for sending data or messages through a communications link established between device and server can consume different amounts of power depending on the frequency and type of messages received and the amount of noise associated with the communications link. The device can dynamically change between communication modes based on an application or quality of service, battery life, an amount of noise associated with the communications link, a frequency of messages, and a type of messages received in a given time period.

Figure 1A:
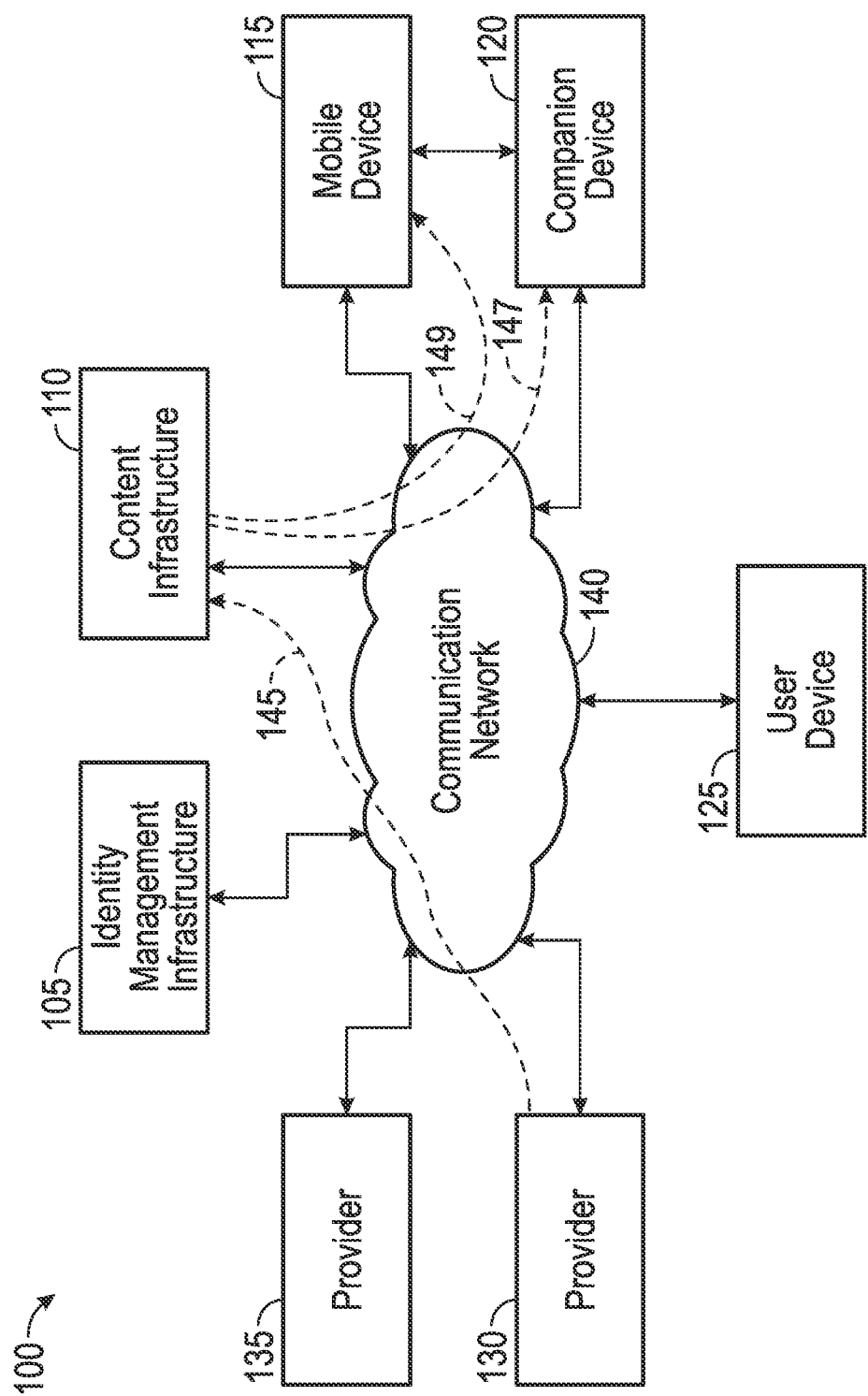
FIG. 1A is a block diagram of an exemplary system according to various examples of the disclosure.

FIG. 1A is a block diagram of an exemplary system according to examples of the disclosure. System 100 can include an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communication network 140. As illustrated, identity management infrastructure 105, content infrastructure 110, mobile device 115, companion device 120, user device 125, provider 130, and provider 135 can be each capable of communicating with and through communication network 140 (representing the Internet, wide area networks (WANs), metropolitan area networks (MANs), local area networks (LANs), wireless area networks (Wi-LANs), radio access networks (RANs), public switched telephone network (PTSN), etc., and/or combinations of the same). As illustrated, mobile device 115 can communicate directly with companion device 120 without utilizing communication network 140.

Identity management infrastructure 105 can be implemented in various examples using a single server computer system or can include multiple server computer systems, web servers, application servers, networks, interconnects, and the like. In various aspects, identity management infrastructure 105 can provide management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, open standard for authorization (OAuth) security token services, or the like.

In some examples, identity management infrastructure 105 can maintain information that authenticates the identity of a managed entity (such as a user, organization, and any associated devices, resources, services, applications, or the like). Identity management infrastructure 105 can verify that an entity is who/what it claims to be by using a password, biometrics such as a fingerprint, a distinctive behavior such as a gesture pattern on a touchscreen, challenge-response protocols, one-time passwords (OTPs), 2-way authentications, and other techniques. Identity management infrastructure 105 can manage authorization information that defines what operations an entity can perform in the context of a specific application, service, or resource. Some authorizations can be based on a role, device type, application, application type, or the like associated with a managed entity. Users can be granted roles related to a particular job or job function. Identity management infrastructure 105 can also manage descriptive information about managed entities and how and by whom that information can be accessed and modified. As part of identity management, one or more host devices can be identified and associated with one or more client devices, such that incoming calls to the host devices can be relayed to the client devices, and such that the client devices can be used to initiate relayed calls using the host devices.

In some examples, identity management infrastructure 105 can create digital identities for managed entities encompassing, for example, entities identifying information (EII) and ancillary information. In some examples, a managed entity can have multiple digital identities, and each digital identity can encompass multiple attributes. For example, a user can have a user identifier (e.g., a phone number, e-mail address, etc.) that is linked to multiple devices. In addition to creation, deletion, modification of digital identities, identity management infrastructure 105 can manage ancillary entity data for use by services, such as content infrastructure 110.

In some examples, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In some examples, identity management infrastructure 105 can receive a single user identifier, which can be used to determine device identifiers for devices associated with the user identifier. During entity registration, in order to access services or resources managed by identity management infrastructure 105, one or more user or other identifiers and a unique entity or device identifier (UID) can be combined to generate an entity or device token. In some examples, the token can be encrypted by applying a hashing algorithm (e.g., SHA-0, SHA-1, SHA-2, MD5, Whirlpool, or other hashing algorithms). The token generated and encrypted for an entity can remain constant in some examples. When a token has been generated and encrypted by identity management infrastructure 105, the token can be sent back to the entity. The entity in some aspects can distribute the token to services or resources managed by identity management infrastructure 105 or other third party services for a variety of purposes relating to authentication, authorization, accounting, or the like.

Content infrastructure 110 can be protected by and/or accessible to entities managed by identity management infrastructure 105. Content infrastructure 110 can be implemented in various examples using a single server computer system or can include multiple server computer systems, web servers, application servers, networks, interconnects, and the like.

Content infrastructure 110 can provide content to mobile device 115, companion device 120, and user device 125 as well as to other devices and entities. Examples of content can include a text message, a multimedia message, an impending calendar event, an audio/video call (e.g., using voice over internet protocol (VoIP)), or a notification of new data on a remote server. In some examples, the content can originate from one or more sources managed by identity management infrastructure 105 or provided directly by content infrastructure 110. In some examples, the content can originate from other sources. For example, content can originate from any one of mobile device 115, companion device 120, user device 125, and/or providers 130 and 135.

In some examples, content can be received from other sources such as the Internet, cellular networks, PSTN, and the like. Content infrastructure 110 can route the content to mobile device 115, companion device 120, user device 125, and providers 130 and 135. In some examples, content infrastructure 110 can route through the infrastructure a voice call received from or destined to a PSTN.

In some examples, the content sent to mobile device 115 can be forwarded to companion device 120 for delivery to mobile device 115. Companion device 120 can also act and send signals on behalf of mobile device 115. In some examples, companion device 120 can act as a main or intermediary device and mobile device 115 can act as a proxied device. Content infrastructure 110 can coordinate how and whether companion device 120 can act and send signals on behalf of mobile device 115.

In some examples, content infrastructure 110 can send content to more than one device, when appropriate. A user may be associated with both mobile device 115 and companion device 120. Content infrastructure 110 can route the content to both mobile device 115 and companion device 120, such as to have a VoIP phone call ring on both devices or to have a message appear in the inbox of the same application installed on both devices. In some examples, content can be sent to only one device (e.g., to companion device 120), which can forward a call to mobile device 115. When a call is being forwarded to a device, a phone number can identify which device is to receive the phone/video call, and that device can relay a call as appropriate.

In some examples, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload can include new information received at a server application or a reference to where the information is to be found. The payload can further include a property list that specifies how the user is to be alerted about this new information by the particular service or client application.

An alert can come in a variety of forms. In some examples, content can be displayed to a user as an alert message or other visual representation, such as a badge associated with an application icon. Availability of the content can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that, in addition to or in the alternative of routing content, implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (i.e., that the provider is who the provider alleges to be) and authorized to connect and utilizes content infrastructure 110 in a trusted manner.

While monitoring for incoming data intended for its client applications, when new data for an application arrives, the provider can prepare and send a notification through its channel connection to content infrastructure 110, which can push the notification to a push consumer or destination target device. Identity management infrastructure 105 can also ensure that the consumer or destination target device is authenticated and authorized to connect to and utilize services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 can be a provider of content to companion device 120, and vice versa as well as provider 130 providing content to provider 135, and vice versa.

In some examples, one or more server computers can provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each of their connections can be authenticated and authorized by identity management infrastructure 105.

If a notification delivered by content infrastructure 110 for an application associated with a user's device arrives when the application is not running, the user's device can alert the user that the application has data waiting for it. Content infrastructure 110 can also provide a default quality-of-service (QoS) component that provides store-and-forward capabilities. If content infrastructure 110 attempts to deliver a notification but a target device is offline, the notification can be stored for a limited period of time, and delivered to the device when it becomes available. In some examples, all recent notifications for a particular application are stored. In some examples, only one recent notification for a particular application is stored. For example, if multiple notifications are sent while the device is offline, each new notification can cause the prior notification to be discarded. This behavior of keeping only the newest notification is referred to as coalescing notifications. In other examples, if the device remains offline for a long time, any notifications that were being stored for it can be discarded.

Provider 130 and provider 135 can be implemented in various examples using a single server computer system or can include multiple server computer systems, web servers, application servers, networks, interconnects, and the like. In various aspects, provider 130 and provider 135 can provide client applications that run on mobile device 115, companion device 120, and user device 125 and server applications that provide one or more services to which the client applications can connect. Provider 130 and provider 135 can seek to notify the client applications accessible to one or more of mobile device 115, companion device 120, and user device 125 that information is available to their respective users.

In some examples, a push provider can be a software developer, company, or organization that maintains server software configured to interact with one or more client applications on one or more of mobile device 115, companion device 120, and user device 125. Provider 130 and provider 135 can each connect with content infrastructure 110 through a persistent and secure channel while monitoring incoming data intended for their client applications. In some examples, provider 130 and provider 135 can connect over a binary interface that provides a high-speed, high-capacity interface (e.g., using a streaming TCP socket design in conjunction with binary content). The binary interface can be synchronous or asynchronous. For each interface, TLS (or SSL) or the like can be used to establish a secured communications channel.

Mobile device 115, companion device 120, and user device 125 can be as a single device, a single computer system, multiple devices, or multiple computer systems. In some examples, mobile device 115, companion device 120, and user device 125, although labeled differently for convenience, can be embodied as a mobile device, a wearable device, or other mobile device (e.g., a laptop, palmtop, mobile phone, smart phone, multimedia phone, portable media player, GPS unit, mobile gaming systems, etc.). In addition to or in the alternative, companion device 120 and user device 125 can be embodied as described above as well as being embodied as personal computer systems, mainframes, server computer systems, cloud services, or the like. Mobile device 115, companion device 120, and user device 125 can include a variety of technologies that provide a communications connection. Some examples of connection technologies include wired connections (e.g., Ethernet, fiber, digital subscriber line (DSL), etc.) and wireless connections (e.g., WiFi, BLUETOOTH (a wireless technology standard for short-range data exchange), WIMAX (a wireless communication standard), 3G, 4G, LTE, etc.).

In some examples, mobile device 115, companion device 120, and user device 125 can host one or more of a variety of client applications that communicate with one or more server applications provided by one or more providers (e.g., providers 130 and 135). These client applications can include applications specific to the intended function of a device (such as telephony applications or GPS applications) as well as e-mail clients, update/upgrade clients, news clients, web/blog clients, podcast clients, social networking clients, or other types of client applications where notification messages can be sent. These client applications can represent to a user one or more notification messages received using content infrastructure 110. Notifications can be represented to users in one or more manners defined by an operating system of the device, a graphical user interface toolkit, and/or the applications themselves. Some examples of representations of notifications include an e-mail indicator, a news item indicator, a podcast indicator, a change of on-line status of a social networking friend, and the like. In some examples, another service operating on a device can handle notifications for client applications.

As discussed above, mobile device 115, companion device 120, and user device 125 can receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In some examples, to ensure trust, a provider communicates the token when it connects with content infrastructure 110. Content infrastructure 110 can decrypt the device token and validate using identity management infrastructure 105 that the token was generated for the destination device. To validate in some examples, content infrastructure 110 can ensure that the device identifier contained in the token matches the device identifier in a device certificate used when the device registered with identity management infrastructure 105.

Referring to an operation of system 100 illustrated in FIG. 1A, in some examples, the operation can be to forward or otherwise communicate a notification message from provider 130 to companion device 120 as illustrated by path 145. In some examples, provider 130 can send an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilize the additional user-defined data to identify provider 130 in a trusted fashion. Other secure communications protocols (e.g., cryptographic protocols such as Transport Layer Security (TLS), etc.) can be used in other examples.

In some examples, where provider 130 can be associated with a particular application (e.g., Email, FACEBOOK (an online social networking service), or TWITTER (an online social networking service)) and can include additional identifying (e.g., user-defined) data within the SSL certificate, Identity management infrastructure 105 can not only authenticate provider 130, but can also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some examples, the additional identifying data can identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service can be automatically provisioned for provider 130.

When provider 130 is trusted, content infrastructure 110 can receive the notification message from provider 130. As discussed above, the notification message can include a device token. Having received the notification message from provider 130, content infrastructure 110 can determine the destination for the notification message. In some examples, the destination can be determined based on the device token that is sent along with notification message. In some examples, it may not be necessary to send destination information as part of a token. By determining or extracting the destination from the device token or otherwise obtaining destination information for the content, content infrastructure 110 can then determine whether the destination is "online" or otherwise accessible.

If the destination is online, in some examples, content infrastructure 110 can route the notification message to the destination companion device 120 illustrated by path 147, for example, via a persistent connection maintained by companion device 120 with content infrastructure 110. If the destination is "offline" or otherwise inaccessible to content infrastructure 110, the content can be stored and delivery retried at a later time. Content infrastructure 110 can, in addition to or alternatively, route the notification message to mobile device 115 illustrated by path 149, for example, via a persistent connection maintained by mobile device 115 with content infrastructure 110. Content infrastructure 110 can route content to a single device, multiple devices at the same time, or to one device for delivery to another device.

Figure 1B:
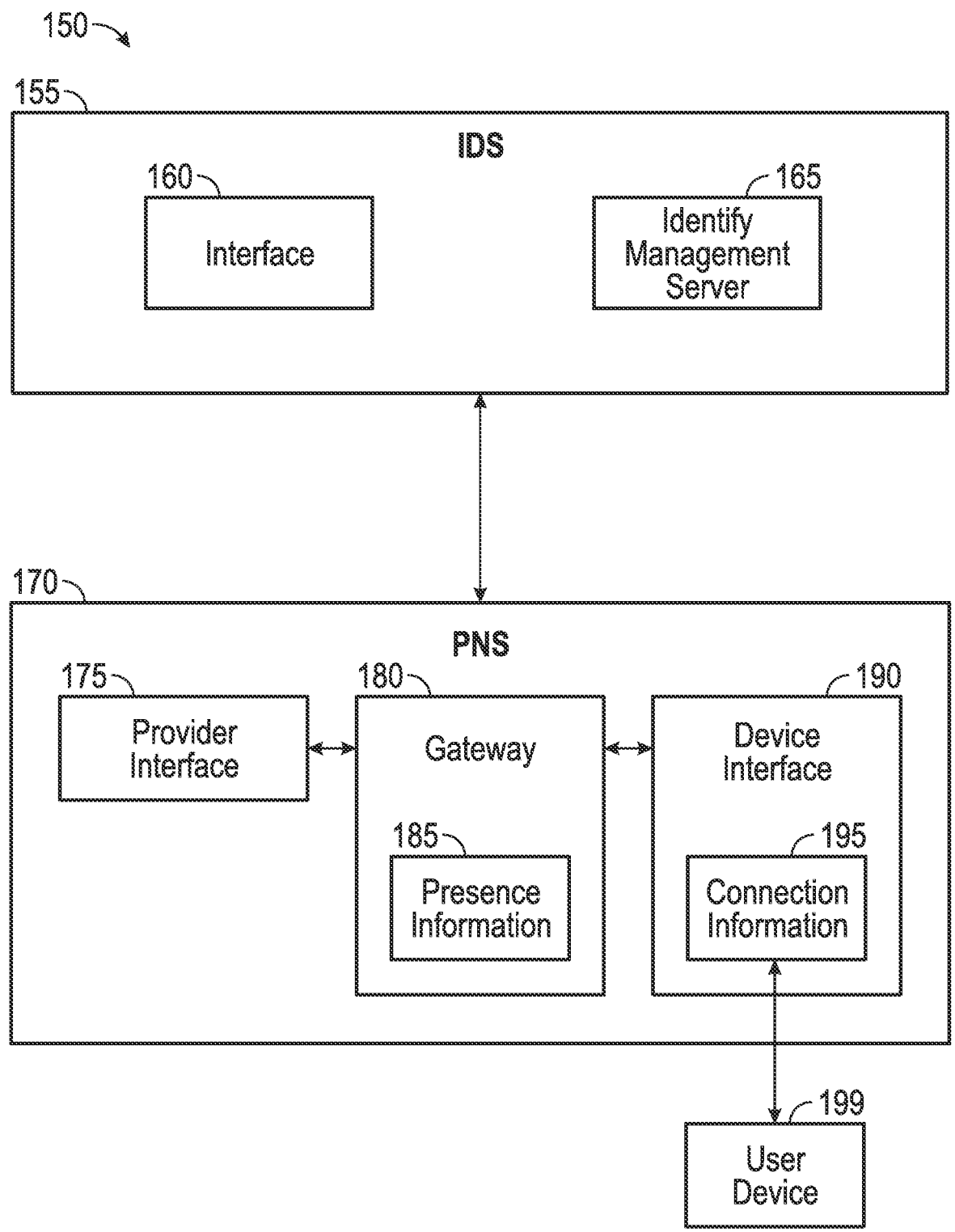
FIG. 1B illustrates a block diagram of an exemplary system configured to facilitate a relay for answering and placing a call according to examples of the disclosure.

FIG. 1B illustrates a block diagram of an exemplary system configured, at least in part, to facilitate a relay for answering and placing a call according to examples of the disclosure. Identity services (IDS) 155 can be used to facilitate discovery and communication between a host device used as a relay and a client device used as a call endpoint. As recited herein, mobile device 115 of FIG. 1A can be considered a host device, and companion device 120 can be considered a client device for the purposes of a relay system. System 150 can be used in a relay system and can be implemented in some examples using a single server computer system or can include multiple server computer systems, web servers, application servers, networks, interconnects, and the like. System 150 can be embodied as content infrastructure 110 of FIG. 1A in some examples.

In particular, FIG. 1B illustrates examples of forwarding content (e.g., notification messages and phone/video calls) between devices (e.g., between providers and mobile devices, or between a sending device of one user and receiving devices of another user). System 150 is shown with IDS 155 having interface 160 and identity management server 165 and push notification services (PNS) 170 having provider interface 175, gateway 180 having presence information 185, device interface 190 having connection information 195, and user device 199. Each service can be implemented using hardware and/or software elements.

In some examples, IDS 155 can be embodied as or form part of identity management infrastructure 105. IDS 155 can be implemented in some examples using a single server computer system or may include multiple server computer systems, web servers, application servers, networks, interconnects, and the like. Interface 160 can enable an entity (e.g., mobile device 115 or provider 130) to connect (e.g., via a network) in order to take advantage of service provided by IDS 155. Interface 160 can incorporate load balancing and other connection management techniques allowing entities to communicate with Identity management server 165.

In some examples, an entity can send information such as an authentication certificate that is received via interface 160 upon an initial connection to IDS 155 or to a service, resource, or application managed by IDS 155 (e.g., PNS 170). Identity management server 165 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 170, entities and their devices can be required to possess certain certificates, certificate authority (CA) certificates, or tokens.

In some examples, each provider of content can use a unique provider certificate and private cryptographic key for validating their connection with PNS 170. This certificate can be provisioned by identity management server 165 and identify the provider and/or a particular topic published by the provider. In general, the topic is a bundle ID of a client application. The provider can optionally wish to validate the service to which the provider is connected using a public server certificate provided by PNS 170. In some examples, the provider can use the public server certificate passed to it by identity management server 165 when registering to authenticate the service to which the provider has connected.

Identity management server 165 can also issue to each device, which desires to receive content, a unique private key and certificate that the device uses to authenticate itself to identity management server 165 and establish a connection to PNS 170. A device can obtain a device certificate and key from identity management server 165 during device activation and can store them in a keychain. The device can also hold its particular device token, which it can receive during the service connection process. Each client application that utilizes PNS 170 can be responsible for delivering this token to its content provider.

Identity management server 165 can store any necessary certificates, CA certificates, and cryptographic keys (private and public) for validating connections and the identities of providers and devices.

In some examples, when the entity is trusted, system 150 can allow the entity to utilize push notification services provided by PNS 170. PNS 170 can be implemented in some examples using a single server computer system or can include multiple server computer systems, web servers, application servers, networks, interconnects, and the like. The entity can be a provider or other notification provider desiring to connect with PNS 170 (e.g., via a network). In some examples, provider interface 175 can provide a high-speed, high-capacity interface allowing push notification providers to communicate with PNS 170. Provider interface 175 can incorporate load balancing and other connection management techniques allowing entities to communicate with PNS 170. Although provider interface 175 is shown as being linked to gateway 180, provider interface 175 can be incorporated into gateway 180 or device interface 190. As discussed above, a user device can be a provider of content in some examples as well as be a destination of content routed using PNS 170.

Gateway 180 can be implemented in some examples using a single server computer system or can include multiple server computer systems, web servers, application servers, networks, interconnects, and the like. Gateway 180 can determine the destination of content (e.g., push messages or call messages) received via provider interface 175 or device interface 190. In some examples, gateway 180 can determine a destination based on presence information 185. In some examples, presence information 185 can be maintained using a device's push token. Accordingly, when a push notification is received at gateway 180 directed to a particular push token, gateway 180 can perform a lookup to determine whether there is a TCP socket descriptor associated with that push token. The socket descriptor can provide the TCP socket information and other networking information needed to transmit the push notification. In some examples, presence information 185 can include mappings between authenticated entities and their connections to PNS 170. These connections can be utilized by PNS 170 for delivering content, notifications, and the like or otherwise communicating with an entity. Each mapping can be indicative of at least one entity and at least one connection mechanism to that entity, such as a network socket connection or other connection identifier. For example, a mapping can identify a destination device by its device token or a provider by its provider identifier. Additional information can be included in each mapping in order to facilitate communication with the entity's device.

In some examples, in order to scale handling of connections from an increasing number of users, devices, and providers utilizing services of PNS 170, device connections in presence information 185 (or the devices themselves) can be managed according to at least one grouping or logical partition called a zone. Functions performed by gateway 180 can be partitioned out to multiple servers that are assigned dynamically to handle these groupings or zones. For example, one or more servers might manage, for a period of time, delivery to destinations assigned to one zone and then switch to managing the delivery of notifications to destinations assigned to a different zone at a later time. Each of these servers can also include routing information that is used to route content to other servers associated with a particular zone of the destination of the content. Thus, when content is received at one server, another server designed to handle a predetermined zone can be determined, and the content can be forwarded to the appropriate server. In some examples, functions performed by gateway 180 can be partitioned out to multiple servers to handle corresponding device connections (e.g., device interface 190).

In some examples, gateway 180 can be linked to device interface 190. Device interface 190 can provide an interface to communicate with user device 199. Device interface 180 can incorporate load balancing and other connection management techniques allowing devices to communicate with PNS 170. Although device interface 190 is shown as being linked to gateway 180, device interface 190 can be incorporated into gateway 180 or provider interface 175.

Device interface 190 can allow presence information 185 to be generated when device interface 190 is connected to user device 199. User device 199 can assert its presence to PNS 170 upon establishing a persistent connection. Device interface 190 can generate a device/connection mapping in connection information 195. Device interface 190 can back-propagate connection information 195 to gateway 180 allowing gateway 180 to generate a device/connection mapping in presence information 185. In some examples, presence information 185 can include a device/courier mapping or link allowing gateway 180 to determine an appropriate courier that acts as device interface 190 connected to user device 199. The courier can utilize connection information 195 (including any device/connection mappings or links) allowing the courier to determine connection information specific to user device 199 that can be used to deliver content to user device 199. In some examples, presence information 185 and connection information 195 can be substantially identical in that they include correspondences between a given device and its connection with PNS 170.

In some examples, a device wishing to receive content via PNS 170 can send authentication information either upon an initial connection with device interface 190 or directly to IDS 155. Identity management server 165 can receive the authentication information either directly or indirectly, and then authenticate and authorize the device or its associated user or organization as a registered and authorized entity. When the device is trusted, PNS 170 can be informed, and PNS 170 thereafter can manage any connections made between the device and PNS 170 (such as with device interface 190 in connection information 195). Device information available at device interface 190 in connection information 195 can be periodically back propagated to gateway 180 to generate or update presence information 185.

When the device initially connects with PNS 170, PNS 170 can provision the device. In some examples, a zone is provisioned for the device as alluded to above. Despite a particular zone assignment for each device, devices can lose their connection with device interface 190 for various reasons. For example, a connection might be lost due to loss of cellular signal, or WiFi signal, loss of power, or because a mobile device has changed geographic locations, etc. In some examples, a connection can be intermitted as opposed to being persistent in order to conserve power or achieve other efficiency metrics.

When user device 199 attempts to reconnect to PNS 170, user device 199 can connect with any courier acting as device interface 190. In examples where device connections are assigned to at least one grouping or zone, device interface 190 can provision a connection with one or more servers of gateway 180 that are assigned to handle the zone of a connecting device. For example, if device interface 190 is connected to user device 199 that is assigned to zone 1, then device interface 190 can provision a connection with one or more servers responsible for managing zone 1. Device interface 190 can then back-propagate device information for user device 199 to the one or more servers responsible for managing zone 1. In similar fashion, device interface 190 can make connections with servers of different zones to back-propagate specific device information for devices associated with those respective zones, ensuring that no matter where or how user device 199 connects to PNS 170, presence information 185 is up to date and available to determine how to route the content. In some examples, device interface 190 can be specific to a wireless carrier or internet service provider (ISP), allowing PNS 170 to support the protocols or physical connections specific to multiple third party entities.

According to some examples, when gateway 180 receives content from provider interface 175, gateway 180 can forward the content received from provider interface 175 to device interface 190 based on its mappings in presence information 185. Device interface 190 can deliver the content received from gateway 180 to user device 199 for which information about a persistent connection can be maintained in connection information 195.

Upon receiving content from gateway 180, device interface 190 can perform a lookup or otherwise consult its device connections in connection information 195 and send the content received from gateway 180 to the appropriate device, for example, over the persistent connection associated with user device 199. In some examples, device interface 190 can inspect the device token associated with the content to be delivered and can determine whether a match is found between the device token and the connections that device interface 190 manages in connection information 195. Device interface 190 can deliver the content using the connection established by the device having the given device token.

In some examples, user device 199 can subscribe to a particular application managed by a provider and can desire to receive notification messages for that application via PNS 170. Thus, user device 199 can call the provider either directly via a communications network or utilizing PNS 170 and can transmit its device token to the provider. The device token or its transmission can include not only a device's identification information but can include an encrypted combination of a device's UID and its zone identifier, allowing PNS 170 to provision connection information for the device according to the appropriate resources allocated to the zone.

When the provider sends a notification message to the particular application on user device 199, the provider can connect to PNS 170 using provider interface 175 and can send the message to gateway 180. Even if user device 199 is associated with a particular zone, the provider may not need to connect to any particular gateway of PNS 170 to successfully push a notification message to user device 199. For example, if gateway 180 receives content from provider interface 175 and the content has a device token, gateway 180 can look at the token and either route the message to an appropriate server of PNS 170 (which may route the message to device interface 190 or another courier of PNS 170) or route the message directly to device interface 190.

If gateway 180 is the designated gateway, gateway 180 can send/forward the message to device interface 190 based on its device/courier mapping in presence information 195 in some examples. Device interface 190 can look up its connections in connection information 195 and can send the message to the device over the persistent connection established by the device with device interface 190. In summary, in cases where PNS 170 receives a message having a particular destination, a gateway of PNS 170 can forward that message directly to an appropriate courier of PNS 170 using a device/courier mapping that can be established when a device connects to PNS 170. In some examples, gateway 180 can send/forward the message directly to user device 199 based on its device/connection mapping in presence information 185. Gateway 180 can generate this mapping information from various sources to each of which a device has established a connection.

Figure 2A:
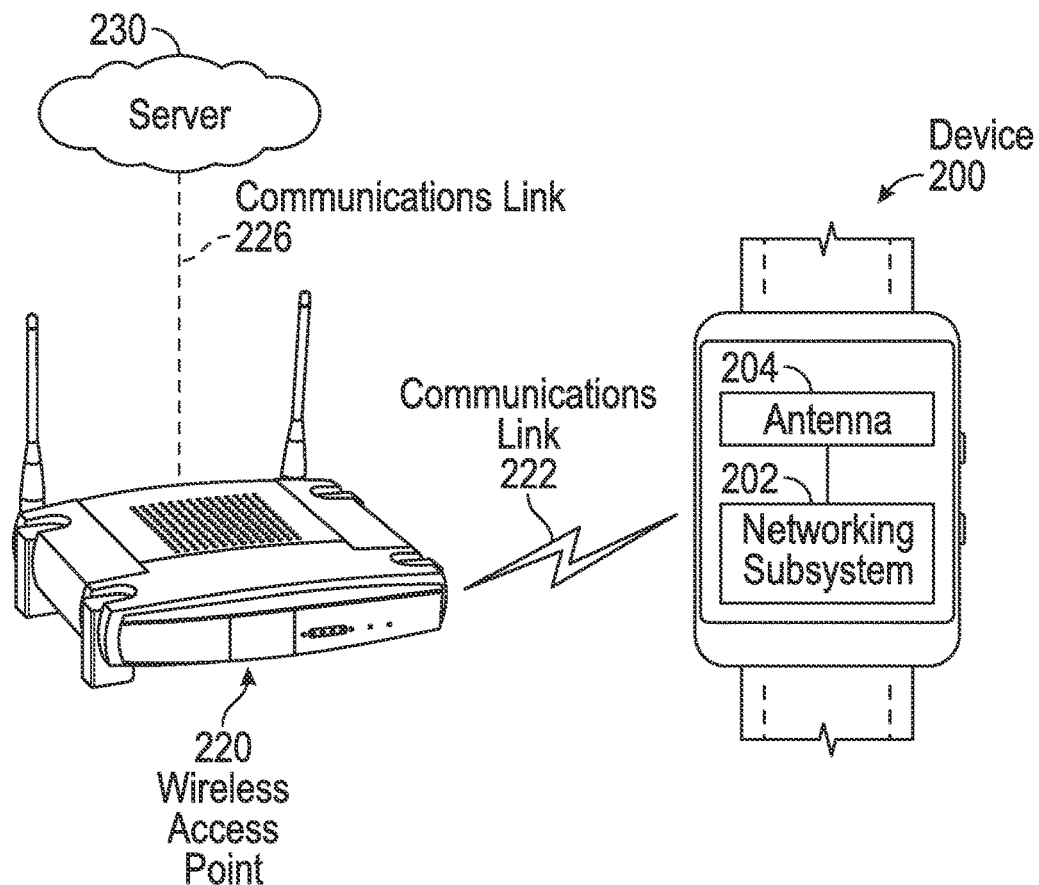
FIG. 2A illustrates an exemplary configuration of a device communicating with a wireless access point to receive data from a server according to examples of the disclosure.

FIG. 2A illustrates an exemplary configuration of a device communicating with a wireless access point to receive data from a server according to examples of the disclosure. Device 200 can be coupled to wireless access point 220 through communications link 222, and wireless access point 220 can be coupled to a server 230 through communications link 226. Device 200 can be companion device 120, and wireless access point 220 can be communication network 140 as illustrated in FIG. 1A, for example. Server 230 can include the functionality of at least one of provider 130 (or provider 135), identity management infrastructure 105 and content infrastructure 110 as illustrated in FIG. 1A or PNS 170 as illustrated in FIG. 1B.

Communications link 222 can be established using a networking subsystem 202 and antenna 204 of device 200. After communications link 222 has been established, wireless access point 220 can periodically transmit beacons to devices (such as device 200) that are located on the network. Beacons are data frames that can contain information about the network. Beacons can include information regarding data received by the wireless access point 220 from server 230. Wireless access point 220 can transmit beacons at periodic intervals, and device 200 can be synchronized to wireless access point 220 to know when these periodic intervals occur. At these periodic intervals, device 200 can wake up or activate its networking subsystem 202 and antenna 204 to receive the beacons. Beacons can include what is known as a traffic indication map (TIM). The TIM can include an indication of the destination device for the data transmitted by wireless access point 220. When device 200 receives a beacon, it can determine if data for device 200 is buffered on server 230 based on the TIM. If the TIM indicates buffered data is pending for device 200, device 200 can proceed to fetch the data from wireless access point 220, and wireless access point 220 can transmit the data from server 230 to device 200.

To conserve power, networking subsystem 202 and antenna 204 of device 200 can enter a low power or no power consumption standby mode when there is no information or data being communicated over communications link 222. When information or data is being communicated during these periodic intervals, networking subsystem 202 and antenna 204 can switch to an active mode. In some examples, the active mode can consume a higher amount of power than the standby mode.

Figure 2B:
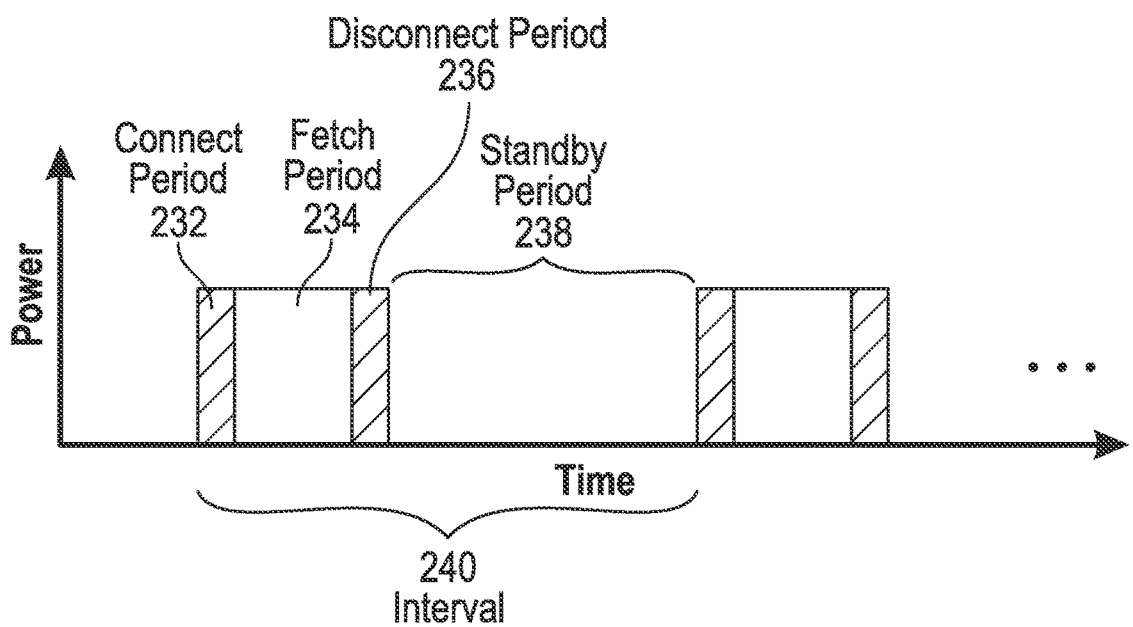
FIG. 2B illustrates an exemplary waveform for a device utilizing a poll and reconnect mode for communicating with a wireless access point.
Figure 2C:
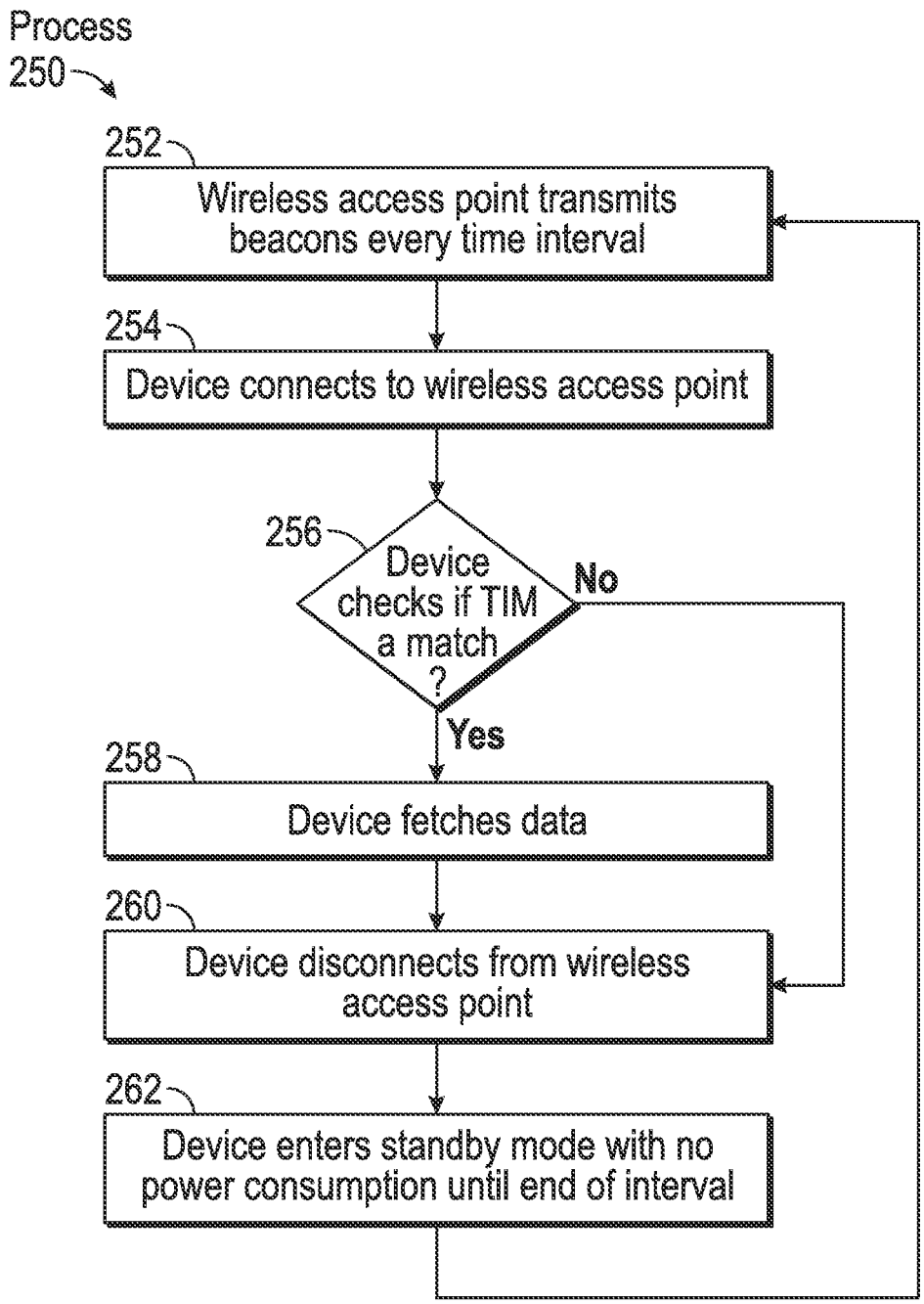
FIG. 2C illustrates an exemplary process for a device utilizing a poll and reconnect mode for communicating with a wireless access point.

FIG. 2B illustrates an exemplary waveform and FIG. 2C illustrates a process for a device utilizing a poll and reconnect mode for communicating to a wireless access point. Networking subsystem 202 and antenna 204 can be synchronized to the clock of wireless access point 220. Wireless access point 220 can transmit beacons (step 252 of process 250), and device 200 can receive the beacons every time interval 240. Device 200 can receive the beacons by connecting to the wireless access point 220 during connect period 232 (step 254). Device 200 can check if the TIM is a match (step 256). If the TIM of one or more of the beacons includes an indication of device 200, device 200 can fetch data during fetch period 234 (step 258). Device 200 can disconnect from the wireless access point 220 during disconnect period 236 (step 260). During the remaining portion of interval 240 (i.e., standby period 238), device 200 can enter a standby mode with no power consumption (step 262). The process can be repeated every interval 240. In some examples, device 200 can connect to wireless access point 220 during connect period 232, receive the one or more beacons, and can determine that the TIM of the beacons does not include an indication of device 200. As a result, device 200 can disconnect from wireless access point 220 during disconnect period 236 without fetching data.

While the networking subsystem 202 and antenna 204 can conserve power with no power consumed during standby period 238 illustrated in FIG. 2B, the device may not be capable of receiving push messages or data. Push messages or push notifications are messages whose communication is initiated by a server (e.g., server 230). In contrast, fetch messages are messages whose communication is initiated by a client (e.g., device 200).

Figure 2D:
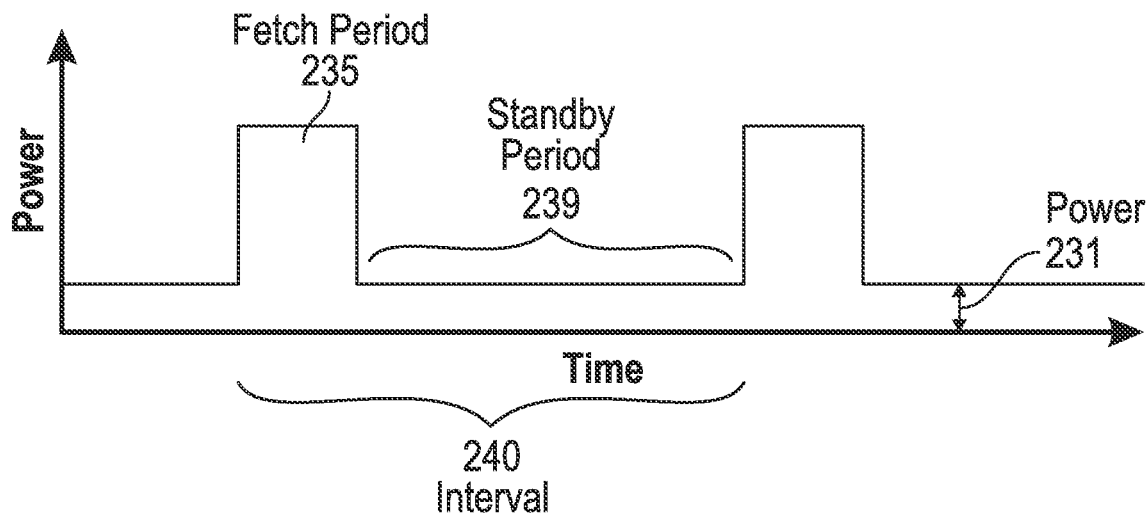
FIG. 2D illustrates an exemplary waveform for a device utilizing an associated polling mode for communicating with a wireless access point.
Figure 2E:
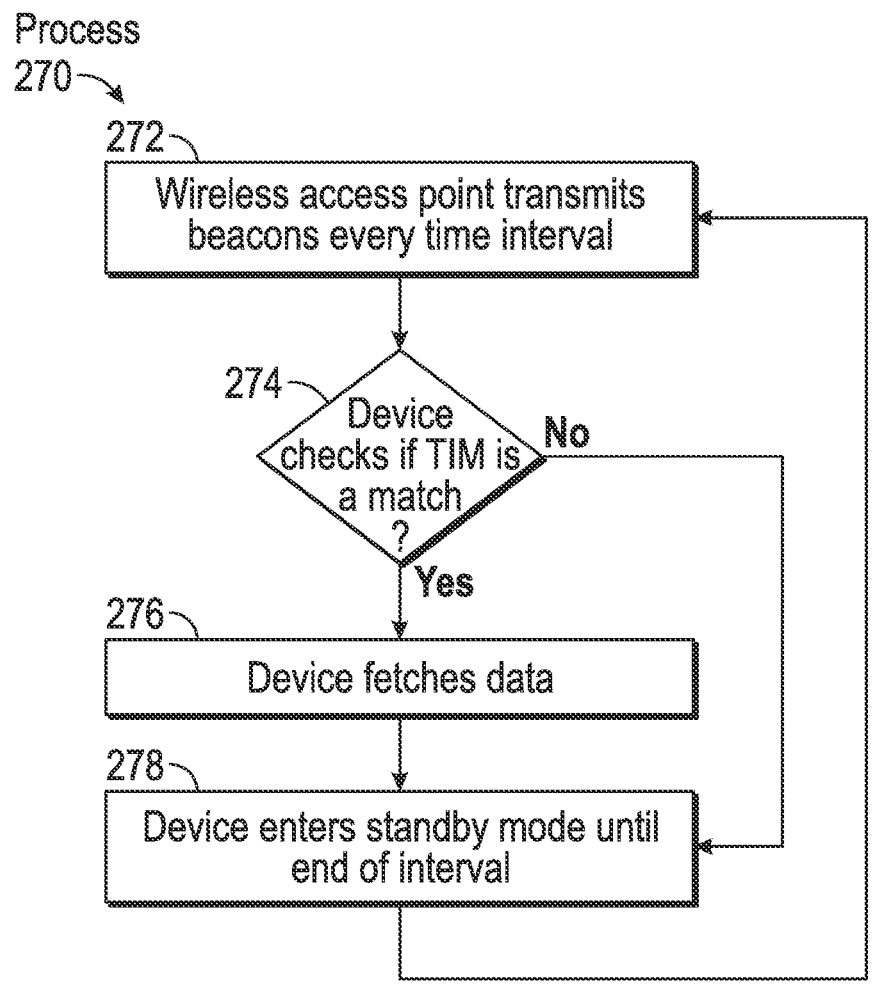
FIG. 2E illustrates an exemplary process for a device utilizing an associated polling mode for communicating with a wireless access point.

To allow device 200 the capability of receiving push messages, networking subsystem 202 and antenna 204 can enter a low power consumption mode, where device 200 remains associated with wireless access point 220 (i.e., the communications link 222 remains actively connected). FIG. 2D illustrates an exemplary waveform and FIG. 2E illustrates an exemplary process for a device utilizing an associated polling mode for communicating with a wireless access point. Communications link 222 can be established during an initialization period (e.g., when device 200 or wireless access point 220 powers on). Wireless access point 220 can periodically transmit one or more beacons including the TIM (step 272 of process 270). Device 200 can check if the TIM matches (step 274). If the TIM of one or more of the beacons includes an indication of device 200, device 200 can fetch the data during fetch period 235 (step 276). During the remaining portion of interval 240 (i.e., standby period 239), device 200 can enter a standby mode with a low power consumption (step 278). During standby period 239, device 200 can remain associated with wireless access point 220. The association allows device 200 to remain connected to wireless access point 220 through communications link 222. Since device 200 is associated during standby period 239, a connect period (such as connect period 232 of FIG. 2A) and a disconnect period (such as disconnect period 236) may not be needed. To remain associated, a low amount of power (such as power 231) may be consumed to avoid needing renegotiations between device 200 and wireless access point 220. Due to the absence of renegotiations, the associated polling mode can include less overhead than the poll and reconnect mode. In some examples, power 231 can be lower than the amount of power consumed during fetch period 235.

Based on the amount of power consumed during connect period 232, disconnect period 236, and standby periods 238 and 239, the frequency of switching to an active mode, and the amount of noise on communications link 222, networking subsystem 202 and antenna 204 can consume a lot of power, reducing the battery life of device 200. In some examples, device 200 can be a miniature device, such as a wristwatch, with a small battery. As such, the power consumed by the networking subsystem 202 and antenna 204 of device 200 can dramatically reduce the battery life and can negatively impact a user's experience.

Figure 3:
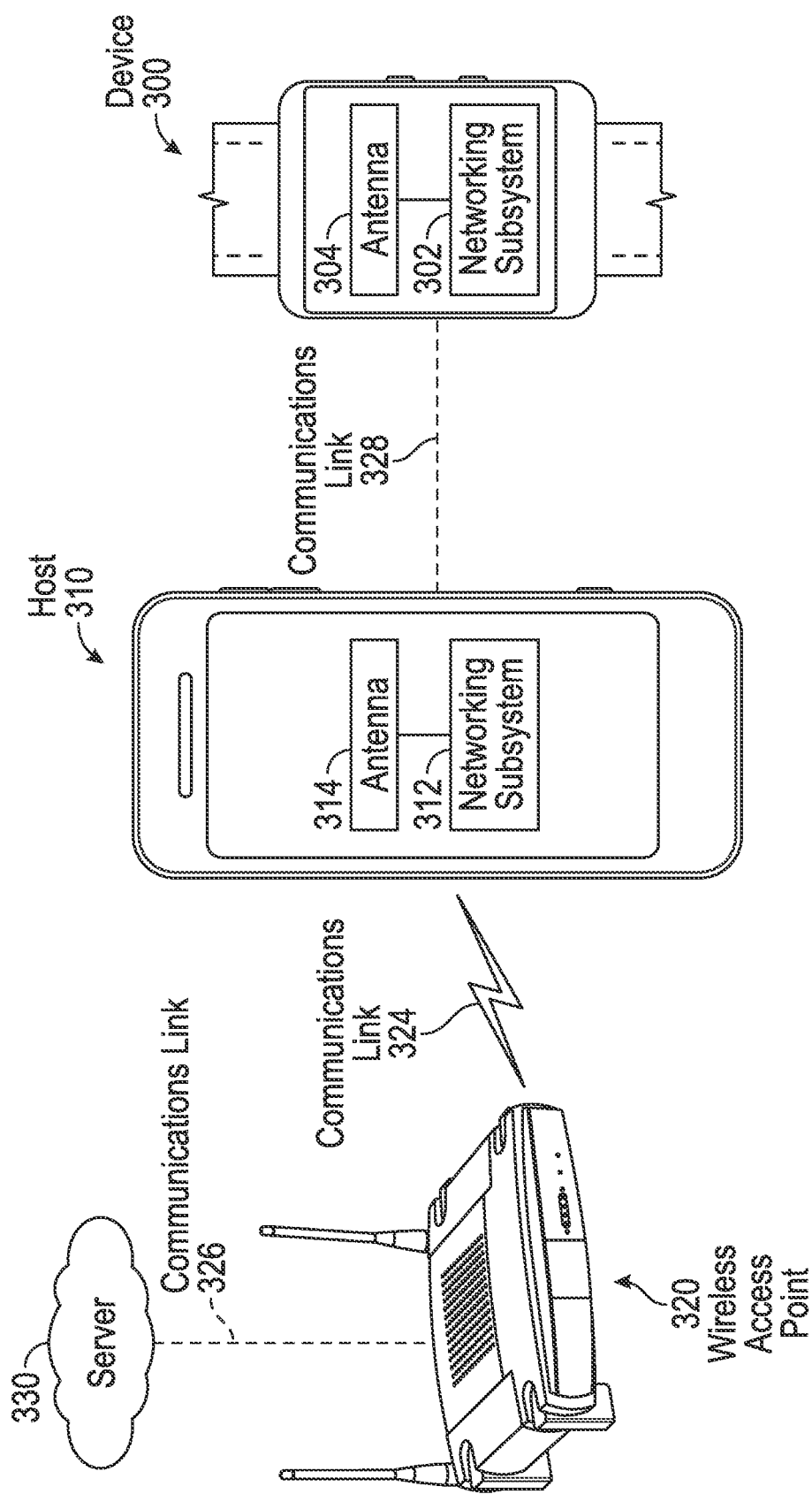
FIG. 3 illustrates an exemplary configuration of a device communicating with a wireless access point through a host device.

To alleviate the issue of a short battery life with device 200, device 200 can be coupled to a host device to receive data from the server through the wireless access point, as illustrated in FIG. 3. Host 310 can be coupled to device 300 through communications link 328, wireless access point 320 can be coupled to host 310 through communications link 324, and server 330 can be coupled to wireless access point 320 through communications link 326. Host 310 can be a proxy device, such as mobile device 115 illustrated in FIG. 1A. In some examples, device 300 can include a battery smaller (i.e., shorter battery life) than the battery of host 310.

To conserve power on device 300, host 310 can maintain a connection to wireless access point 320 through communications link 324. Host 310 can wake up or activate its networking subsystem 312 and wireless antenna 314 to receive beacons transmitted by wireless access point 320. In some examples, wireless access point 320 can be coupled to a plurality of devices. As a result, host 310 can receive one or more beacons designated for other devices. If a beacon indicates that data is buffered on server 330 for device 300, host 310 can proceed to fetch data from wireless access point 320, and wireless access point 320 can transmit the data from server 330 to host 310. Device 300 can wake up its networking subsystem 302 and antenna 304, and host 310 can transmit the data to device 300 through communications link 328. By designating host 310 instead of device 300 to synchronize to and communicate directly with wireless access point 320, the power consumption of device 300 can be decreased, as unnecessary wake ups of device 300 (e.g., for beacons whose TIM does not match device 300) can be avoided.

Although the exemplary configuration illustrated in FIG. 3 can reduce the power consumption of device 300, in some examples, device 300 may not be coupled to host 310 (e.g., either communications link 324 or 328 or both are unavailable). In such a configuration, the device may need to receive messages by periodically receiving the beacons transmitted by the wireless access point (as illustrated in FIG. 2A).

One way to conserve power can be to reduce the power consumed during the standby period. While the poll and reconnect mode illustrated in FIG. 2B can consume no power during standby period 238, the power required to connect to wireless access point 220 during connect period 232 and the power required to disconnect from wireless access point 220 during disconnect period 236 can be significant. For example, the power required to connect and disconnect can be 180 mW. The amount of time required to connect during connect period 232 can be 2.5 seconds, and the amount of time required to disconnect during disconnect period 236 can be 0.5 seconds. Therefore, at least 540 mW-seconds can be consumed at every interval 240, and more can be consumed if device 200 fetches data during fetch period 234.

The associated polling mode (as illustrated in FIGS. 2D-2E) can consume low power (e.g., 5 mW) during standby period 239. However, certain standby periods can negatively affect a user's experience. For example, a standby period 239 of 5 minutes can lead to at least 1500 mW-seconds consumed at every interval 240. With the associated polling mode, the user's experience can be negatively affected due to the large amount of power consumed during the standby period 239.

Figure 4A:
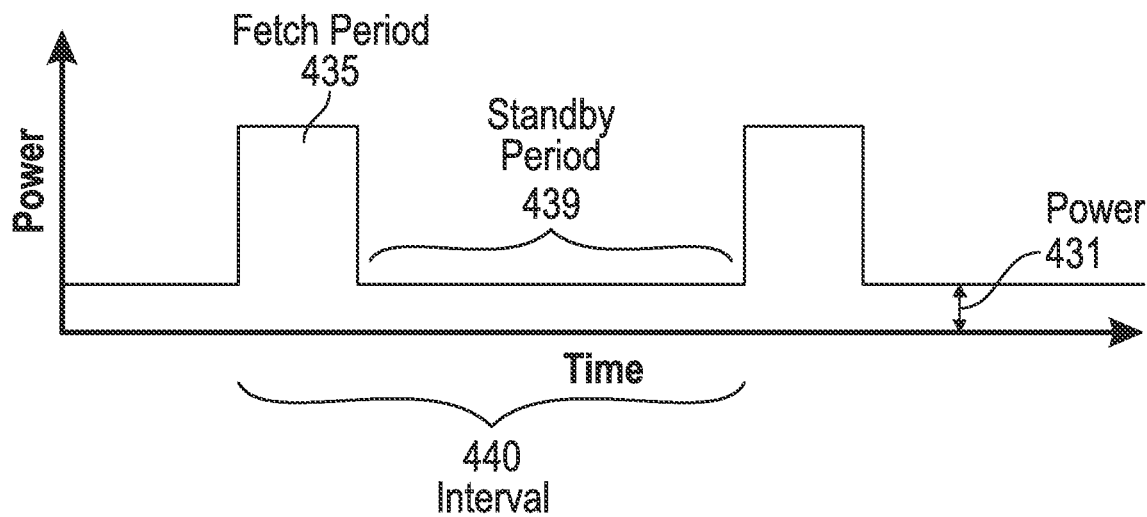
FIG. 4A illustrates an exemplary waveform for a device utilizing a low power associated sleep mode for communicating with a wireless access point according to examples of the disclosure.
Figure 4B:
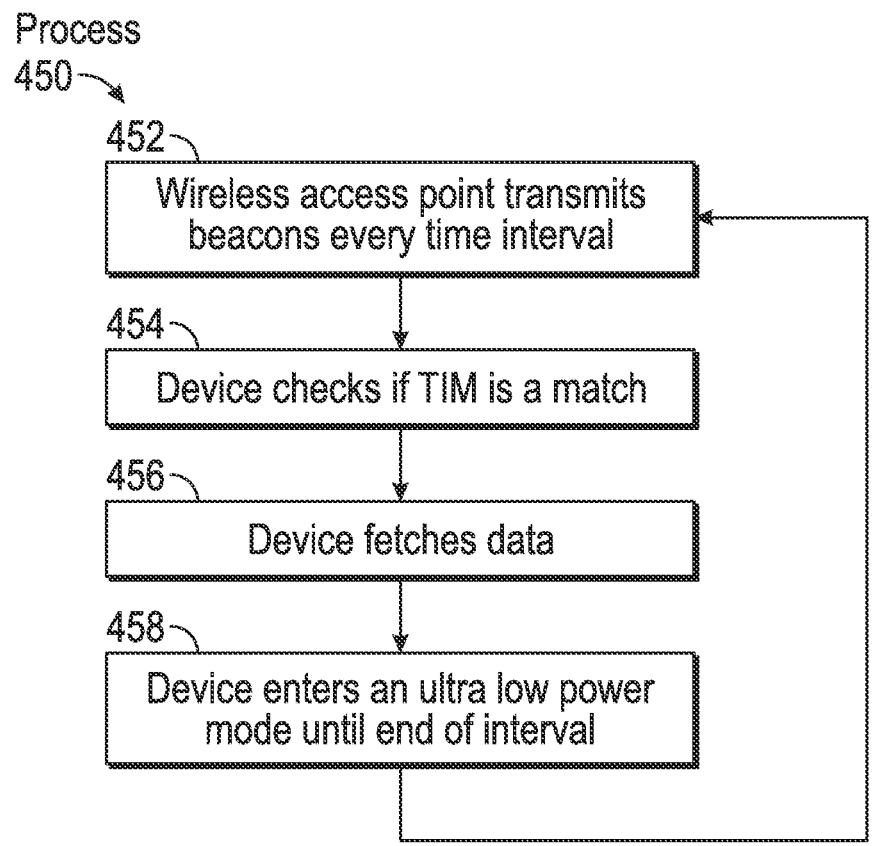
FIG. 4B illustrates an exemplary process for a device utilizing a low power associated sleep mode for communicating with a wireless access point according to examples of the disclosure.

FIG. 4A illustrates an exemplary waveform and FIG. 4B illustrates an exemplary process for a device utilizing a low power associated sleep mode for communicating with a wireless access point according to examples of the disclosure. The device can enter a low power consumption mode, where the device remains associated with a wireless access point through a communications link. The communications link can be established during an initialization period (e.g., when the device or wireless access point powers on). Wireless access point can periodically transmit one or more beacons including the TIM (step 452 of process 450). The device can check if the TIM is a match (step 454). If the TIM of one or more of the beacons includes an indication of the device, the device can fetch data during fetch period 435 (step 456). During the remaining portion of interval 440 (i.e., standby period 439), device 400 can enter a standby mode (step 458). During standby period 439, the device can remain associated with the wireless access point. The association allows the device to maintain connection to the wireless access point through the already-established communications link. However, unlike the association during standby period 239 of FIG. 2D, the association during standby period 439 may not allow the device to receive push messages. As a result, the amount of power 431 consumed during the standby period 439 (e.g., 1 mW) of the low power associated sleep mode can be lower (i.e., ultra-low power) than the amount of power 231 consumed during standby period 239 (e.g., 5 mW) of the associated polling mode.

A standby period 439 of 5 minutes can lead to at least 300 mW-seconds consumed at every interval 440, whereas the same standby period 239 of 5 minutes can lead to at least 1500 mW-seconds consumed at every interval 240. As a result, the amount of power consumed using the lower power associated sleep mode illustrated in FIGS. 4A-4B can be lower than the amount of power consumed using the associated polling mode illustrated in FIGS. 2D-2E.

Fetch or pull messages can be suitable for some applications, whereas push messages can be suitable for other applications. For example, pull messages can be suitable for HTTP requests from websites, whereas push messages can be suitable for instant messaging applications. For applications where push messages are suitable, an alternative mode, such as one illustrated in FIG. 5A, can be used.

Figure 5A:
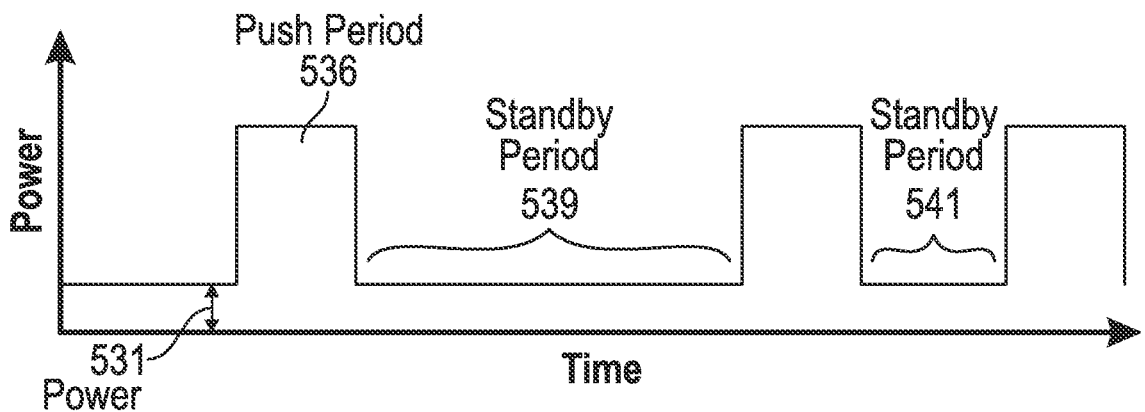
FIG. 5A illustrates an exemplary waveform for a device utilizing a push mode for communicating with a wireless access point according to examples of the disclosure.
Figure 5B:
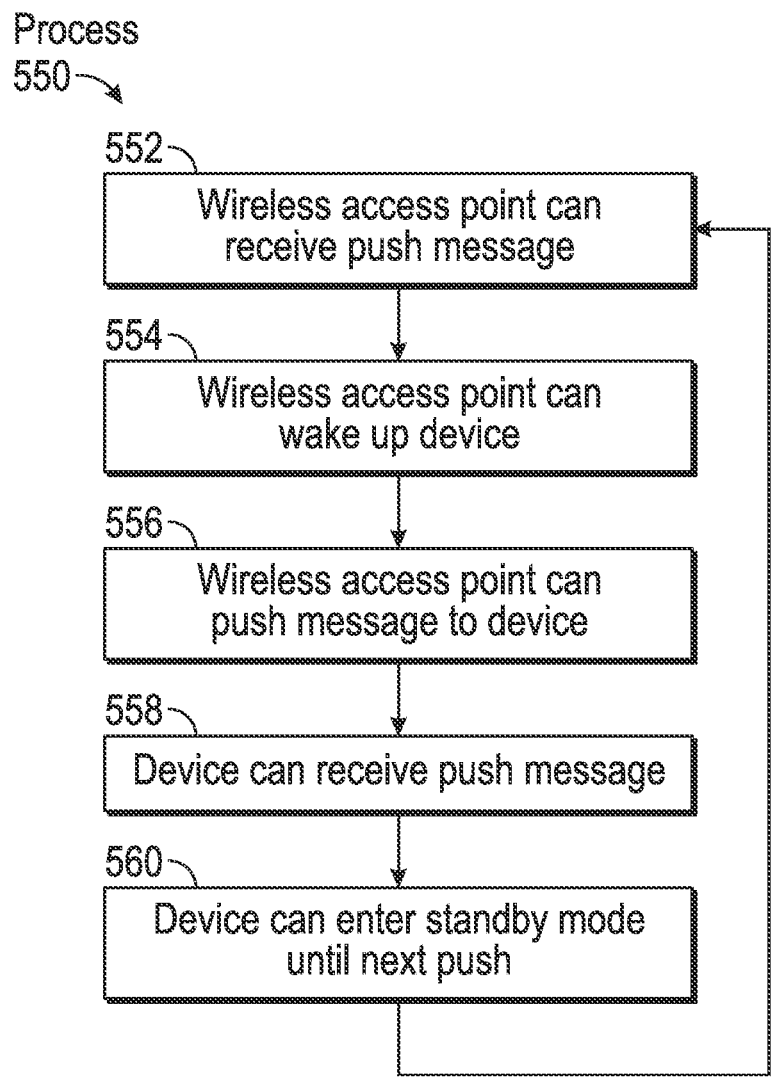
FIG. 5B illustrates an exemplary process for a device utilizing a push mode for communicating with a wireless access point according to examples of the disclosure.

FIG. 5A illustrates an exemplary waveform and FIG. 5B illustrates an exemplary process for a device utilizing a push mode for communicating with a wireless access point according to examples of the disclosure. The wireless access point can receive one or more push messages in step 552 of process 550. In response to receiving a push message, the wireless access point can wake up the device (step 554) and push the message to the device (step 556). In step 558, the device can receive the push messages. In step 560, the device can enter a standby mode during standby periods (such as standby periods 539 and 541) until the next push. During standby periods 539 and 541, the device can remain associated with the wireless access point. The association allows both the device and the wireless access point to maintain connected through a communications link. During the standby periods 539 and 541, the device can be configured to receive push messages. In some examples, standby period 539 and 541 can be the same. In some examples, standby period 539 and 541 can be different.

Certain applications can require instant delivery of messages (or instant push of messages), and a slight delay of delivery of messages can be acceptable for other applications. In such a situation, the applications that require instant delivery can push messages during the standby periods (e.g., standby period 539 and 541) and/or during push period 536. For applications where a slight delay of delivery of messages is acceptable, messages can accompany another one or more other push or pull messages. In some examples, a message can be pushed after a certain amount of time has elapsed.

To extend or prolong overall battery life while enhancing a user's experience, the device can utilize the push mode for applications requiring instant delivery of push messages. For applications where delivery of messages can be delayed, the low power associated sleep mode can be used. That is, the device can dynamically change between the modes based on the type of application. In some examples, the device can dynamically change or switch between the modes when a same application is running.

Figure 6A:
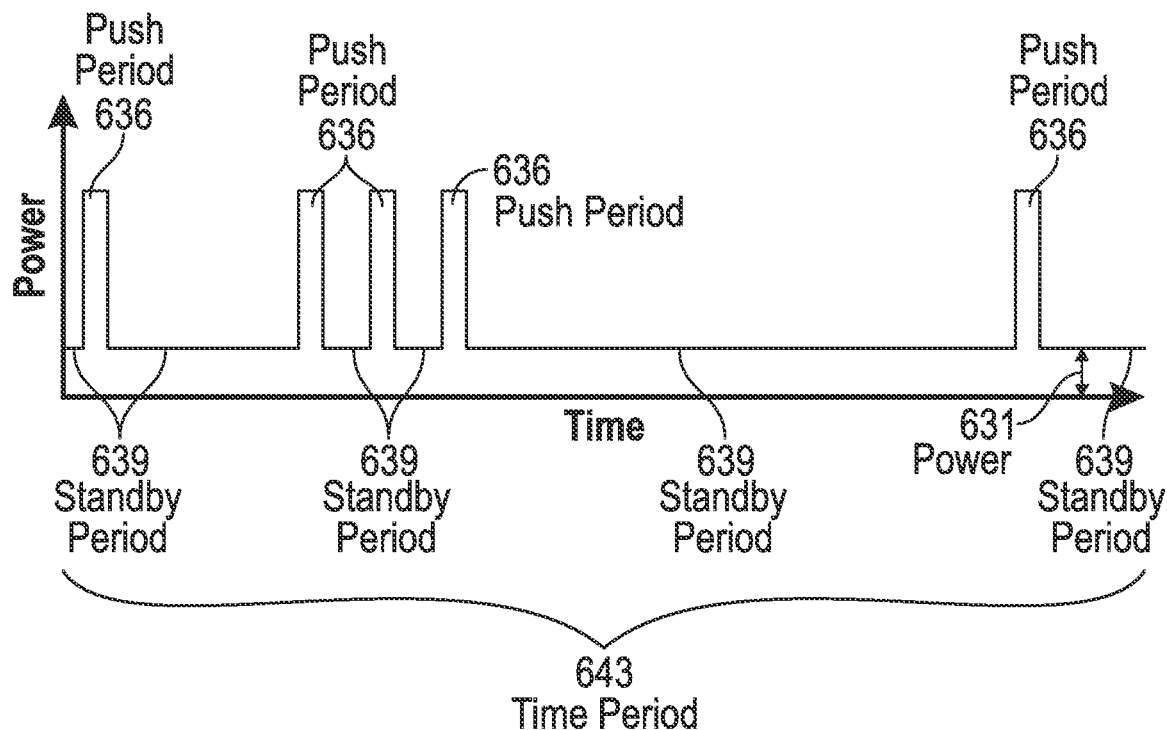
FIG. 6A illustrates an exemplary waveform for a device utilizing a push mode for communicating with a wireless access point when the number of pull messages is greater than the number of push messages according to examples of the disclosure.

In some examples, the device can additionally or alternatively conserve power by selecting a mode based on the number of pull messages and the number of push messages during a given time period. If the number of pull messages is greater than the number of push messages, the device can select the push mode where a pull message can accompany a push message. For example, a device can be configured to receive 5 push messages and 15 pull messages during a given time period, and 180 mW power for 1 minute (e.g., 10,800 mW-seconds) can be consumed every time the device receives a push message. FIG. 6A illustrates an exemplary waveform of a device utilizing a push mode for communicating with a wireless access point when the number of pull messages is greater than the number of push messages according to examples of the disclosure. The device can consume 54,000 mW-seconds for the five push messages received during push periods 636 and 16,500 mW-seconds for the standby periods 639, where the power 631 during the standby mode is 5 mW. That is, a total of 70,500 mW-seconds can be consumed during the given time period 643 using the push mode.

Figure 6B:
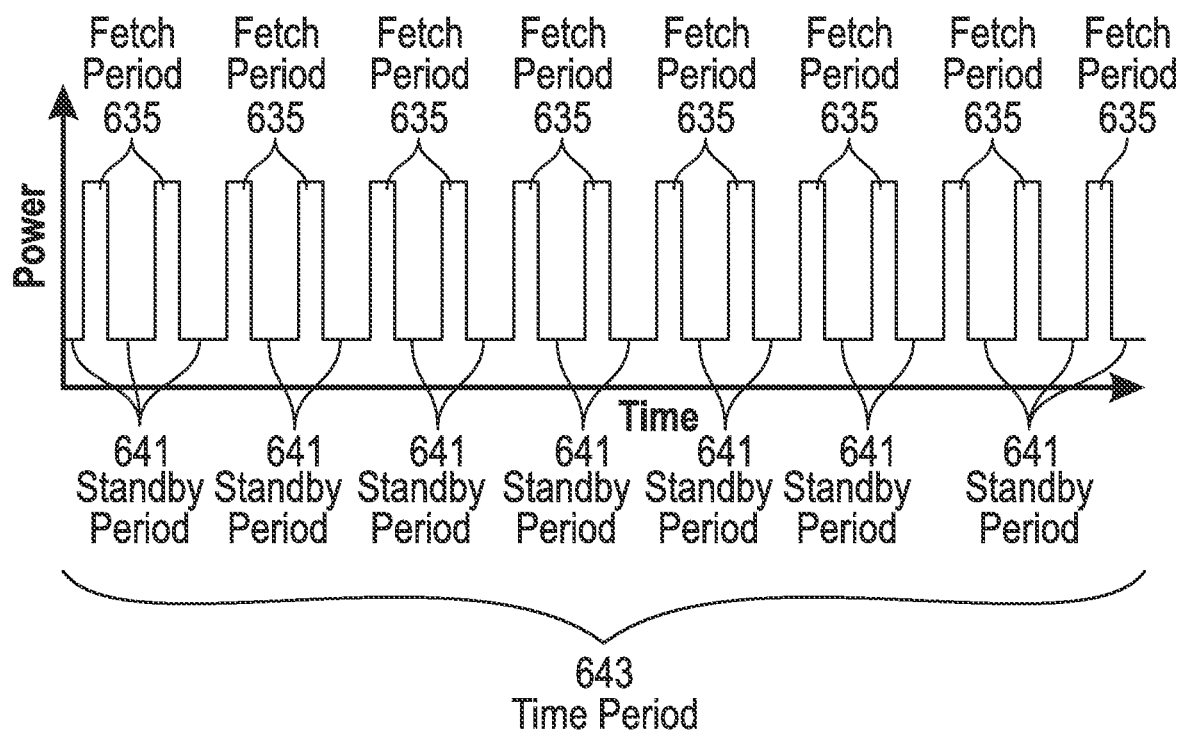
FIG. 6B illustrates an exemplary waveform for a device utilizing a low power associated sleep mode for communicating with a wireless access point according to examples of the disclosure.

On the other hand, an exemplary waveform of a device that selects the low power associated sleep mode is illustrated in FIG. 6B. The device can consume 162,000 mW-seconds for the 15 pull messages retrieved during fetch periods 635 and 2,700 mW-seconds for the standby periods 641. That is, a total of 164,700 mW-seconds can be consumed during the given time period 643 using the low power associated sleep mode. In such a situation where the number of pull messages is greater than the number of push messages, the device can conserve 94,200 mW-seconds in time period 643 by selecting the push mode.

Figure 6C:
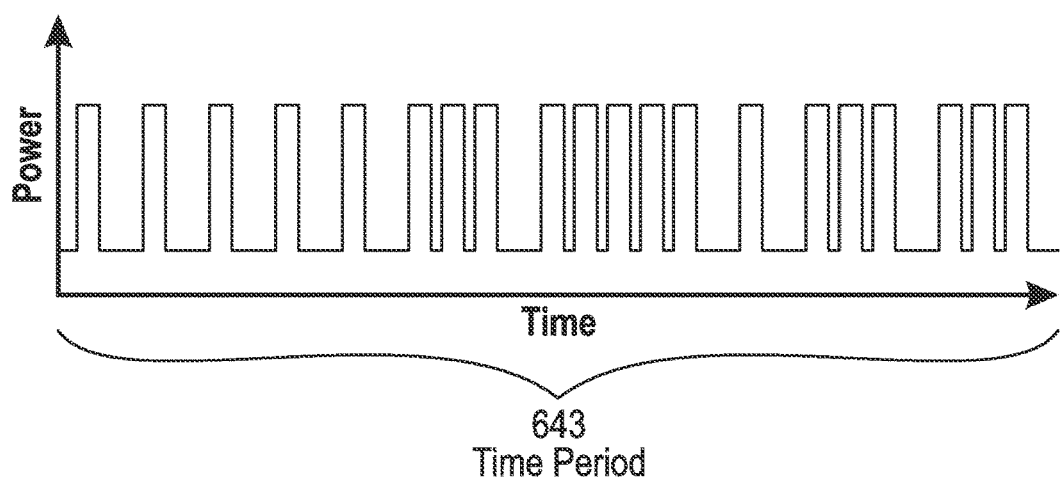
FIG. 6C illustrates an exemplary waveform of a device utilizing a push mode for communicating with a wireless access point when the number of push messages is greater than the number of pull messages according to examples of the disclosure.

In another example, a device can receive 20 push messages and 15 pull messages during a given time period, and 180 mW power for 1 minute (e.g., 10,800 mW-seconds) can be consumed every time the device receives a push or pull message. FIG. 6B illustrates an exemplary waveform of a device utilizing a low power associated sleep mode for communicating with a wireless access point according to examples of the disclosure. As discussed above, a total of 164,700 mW-seconds can be consumed during a given time period using the low power associated sleep mode. On the other hand, a device that selects the push mode is illustrated in FIG. 6C. The device can consume 216,000 mW-seconds for the 20 push periods and 12,000 mW-seconds for the standby periods. That is, a total of 228,000 mW-seconds can be consumed during a given time period using the push mode. In such a situation where the number of push messages is greater than the number of pull messages, the device can conserve 63,300 mW-seconds in time period 643 using the low power associated sleep mode.

In some examples, the device can conserve power by selecting a mode based on the amount of traffic (i.e., noise) or the behavior of a network. If the network has a relatively high amount of noise, the device can spend a significant amount of power filtering out the noise. For example, a device can be coupled to a wireless access point on a noisy network, such as a public network. The noisy network can require 40 mW of power in the standby mode. Using the example illustrated in FIG. 6A, the device can consume 132,000 mW-seconds for the standby periods 639, leading to a total power consumption of 186,000 mW-seconds in time period 643. Compared to the 164,700 mW-seconds consumed by the low power associated sleep mode, the device can conserve more power by selecting the low power associated sleep mode in such a situation.

In some examples, the device can be coupled to a network with a relatively low amount of noise, such as a private home network. The home network can require a lower amount of power (compared to the power consumed from the noisy network) to filter through the noise. For example, 1.1 mW of power in the standby mode can be consumed on the home network for the push mode. Using the example illustrated in FIG. 6B, the device can consume 2,700 mW-seconds for the standby periods 641, leading to a total power consumption of 164,700 mW-seconds in time period 643 using the low power associated sleep mode. If, however, the device is connected to the wireless access point through the home network, the device can consume 2,640 mW-seconds for the standby periods 641, leading to a total power consumption of 218,640 mW-seconds for the push mode. Although the push mode can lead to higher power consumption, the power consumed for the push mode can be comparable to the power consumed for the low power associated sleep mode while providing the user with instant delivery. In such a situation, the user may be willing to compromise the extra power consumed for instant delivery of push messages.

In some examples, the amount of noise on the network can dynamically change due to an increased amount of traffic, for examples. In such examples, the device can monitor the network connection and determine the amount of noise. If the amount of noise exceeds a predefined threshold value, the device can dynamically switch to a different mode.

In some examples, the device can select a mode based on battery life. When the device's battery falls below a predetermined valued (e.g., 20% battery life), the device can select the mode that leads to a lower power consumption. In some examples, the device can determine a rate of power consumption (e.g., 2% battery life/minute) for each mode, and the selected mode can be based on the rate.

In some examples, the device can include a red-list. A red-list is a record including identifiers of restricted applications that is generated and maintained at the device (such as device 200 of FIG. 2A and device 300 of FIG. 3A). The restricted application identifiers corresponding to applications installed on the device for which delivery of push messages can cause the device to transition into an active state without prompting a user associated with the device to interact with the respective installed applications. Examples of such red-listed applications can include, but are not limited to, calendar application, contacts application, and image library organizer application. If a push message for a red-listed application is received at the device when the device is in an inactive state, then a process (e.g., a notification handler process) running at the device can temporarily store the push message received for the red-listed application in a memory at the device without causing the device to transition from the inactive state to an active state.

In contrast with the red-listed applications, other applications installed on the device are such that delivery of push messages can cause the device to transition into the active state prompting the user to interact with the respective installed applications. As their identifiers are not included in the red-list, the foregoing applications are referred to as non-red-listed applications. Examples of such non-red-listed applications are lost device locator applications, voice over Internet protocol (VoIP) applications, video conference applications, etc. If a push message for a non-red-listed application is received at the device when the device is in the inactive state, then the notification handler process can cause the device to transition from the inactive state to the active state. In addition to causing activation of the device, the notification handler process can also deliver the notification received from the non-red-listed application along with the notification stored for the red-listed application.

By using the above-mentioned delivery mechanism for red-listed applications and non-red-listed application, the battery life of the battery-powered device can be prolonged. The one or more power optimization modes can be based on whether an application received is a red-listed application or a non-red-listed application. For example, for delivery of push messages for non-red-listed applications, the device can dynamically switch to a push mode.

Figure 7:
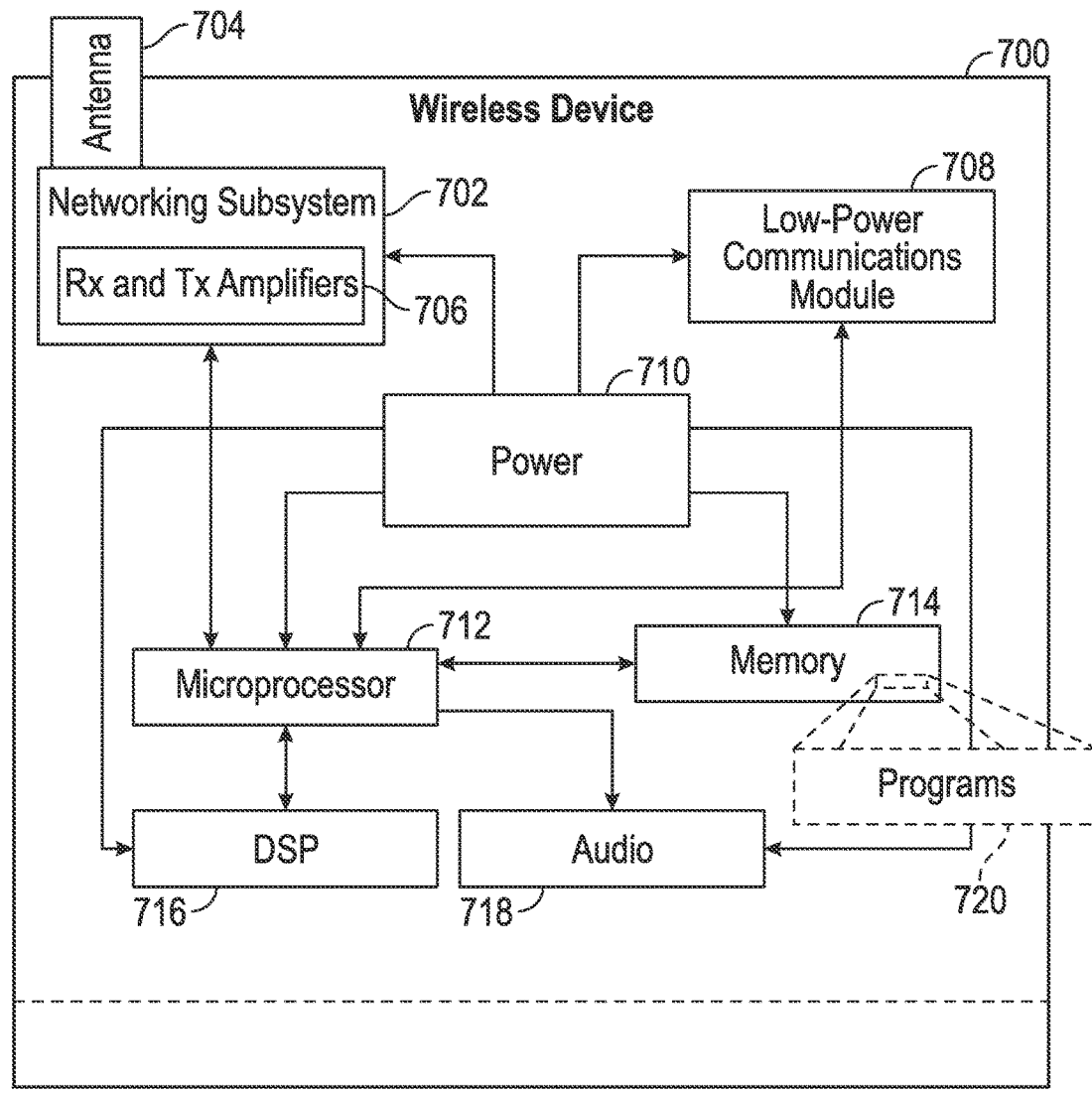
FIG. 7 illustrates an exemplary block diagram of a wireless device according to examples of the disclosure.

FIG. 7 illustrates an exemplary block diagram of a wireless device according to examples of the disclosure. Antenna 704 can be designed to emit and receive electromagnetic waves according to a wireless or air interface standard such as IEEE 802.11. In some examples, antenna 704 can be adapted to communicate with a wireless access point, which provides wireless device 700 with access to a broad network (e.g., the Internet). In some examples, networking subsystem 702 can have a transceiver adapted to convert the electromagnetic waves to current and ultimately to digital data, and conversely the digital data to current and then to electromagnetic waves (as applicable). One or more receive and/or transmit amplifiers 706 can optionally be used to amplify signals for transmission, as is well known in the art. Wireless device 700 can also contain a low-power communications module 708 that can be configured to operate low power, near field communications with proximal devices. As an example, module 708 can be configured to communicate with other devices using BLUETOOTH (a wireless technology standard for short-range data exchange) Low Energy.

The exemplary wireless device 700 can further have a central processing unit (such as integrated circuit microprocessor 712 and/or a digital signal processor (DSP), discussed below) which can adapt to perform basic processing operations of the wireless device 700. Memory 714 can have one or more storage devices capable of storing signals as bits of data. Memory 714 can therefore have any combination of volatile memory or non-volatile memory in according with the scope of the present application (for example, DRAM, SRAM, flash memory, EAROM, EPROM, EEPROM, and/or myriad types of memory modules).

Wireless device 700 can optionally include an audio controller 718 and one or more DSPs 716 for audio, signal, image and/or video processing. A power source 710 such as a battery provides power to the various components of wireless device 700.

In some examples, microprocessor 712 can be adapted to execute one or more software programs 720 stored in memory 714. The term "programs" can be understood to mean software modules that include computer code to execute via a processor to operate the wireless device 700. Programs 720 can, upon detecting a specific control signal, modify the functionality of wireless device 700 according to the type of signal detected, or alternatively, by the contents of the signal provided (e.g., commands embedded within a WiFi beacon).

Note that one or more of the functions described above can be performed, for example, by firmware stored in memory 714 (e.g., one of the programs 720) and executed by microprocessor 712. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disk such as CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figures 8A, 8B, 8C:
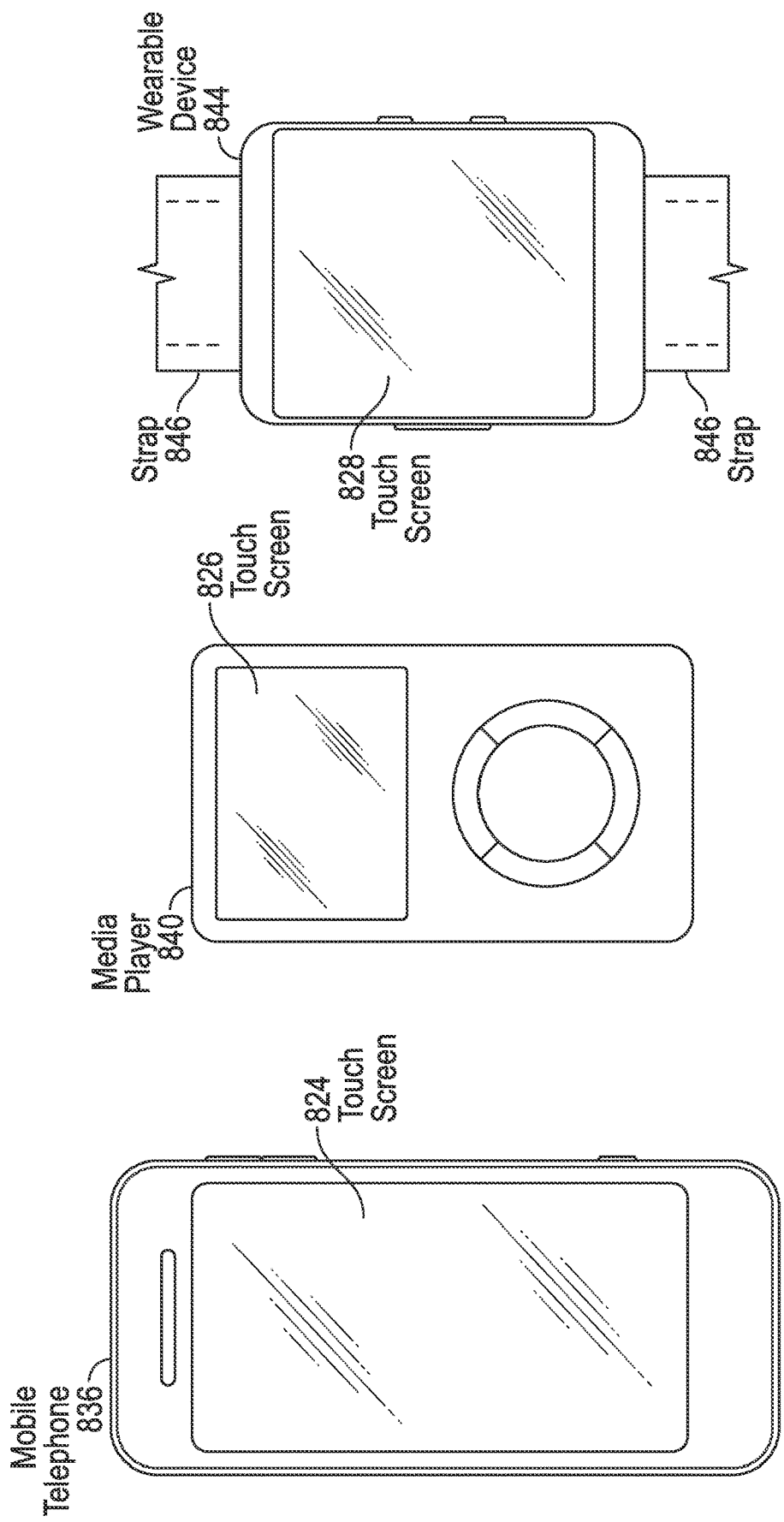
FIGS. 8A-8C illustrate systems in which examples of the disclosure can be implemented.

FIGS. 8A-8C illustrate systems in which examples of the disclosure can be implemented. FIG. 8A illustrates an exemplary mobile telephone 836 that can include a touch screen 824. FIG. 8B illustrates an exemplary media player 840 that can include a touch screen 826. FIG. 8C illustrates an exemplary wearable device 844 that can include a touch screen 828 and can be attached to a user using a strap 846. The systems of FIGS. 8A-8C can utilize the power optimization modes for communicating with a server or wireless access point according to examples of the disclosure.

In some examples, a device is disclosed. The device may comprise: a transceiver configured for communicating through a communications link to a wireless access point; and a processor capable of dynamically switching between at least a first mode and a second mode of communication, each mode including a first period and a second period, wherein the processor is further capable of receiving or retrieving data during the first period and switching to an inactive state during the second period. Additionally or alternatively to one or more examples disclosed above, in other examples, the transceiver is configured to remain associated with the wireless access point during the inactive state. Additionally or alternatively to one or more examples disclosed above, in other examples, the second period of the second mode consumes a lower power than the second period of the first mode. Additionally or alternatively to one or more examples disclosed above, in other examples, the transceiver is configured to receive push messages during the second period of the first mode. Additionally or alternatively to one or more examples disclosed above, in other examples, the first period of the first mode is spaced at periodic intervals. Additionally or alternatively to one or more examples disclosed above, in other examples, the processor is further capable of determining a number of push messages and a number of pull messages within a given time period. Additionally or alternatively to one or more examples disclosed above, in other examples, the processor is further capable of switching to the first mode when the number of pull messages is greater than the number of push messages. Additionally or alternatively to one or more examples disclosed above, in other examples, the processor is further capable of switching to the second mode when the number of push messages is greater than the number of pull messages. Additionally or alternatively to one or more examples disclosed above, in other examples, the processor is further capable of selecting between the first mode and second mode based on at least one of an application, a battery life, and an amount of noise associated with the communications link. Additionally or alternatively to one or more examples disclosed above, in other examples, the processor is further capable of determining whether an application is a red-list application and selecting between the first mode and second mode based on the determination. Additionally or alternatively to one or more examples disclosed above, in other examples, the processor dynamically switches modes when running a same application. Additionally or alternatively to one or more examples disclosed above, in other examples, the processor dynamically switches modes when a noise associated with the communications link exceeds a predetermined value.

In some examples, a method for communicating with a wireless access point is disclosed. The method may comprise dynamically switching between a first mode and a second mode of communication, each mode including a first period and a second period; receiving or retrieving data during the first period; and switching to an inactive state during the second period. Additionally or alternatively to one or more examples disclosed above, in other examples, the method further comprises maintaining association with the wireless access point during the inactive state. Additionally or alternatively to one or more examples disclosed above, in other examples, the second period of the second mode consumes a lower power than the second period of the first mode. Additionally or alternatively to one or more examples disclosed above, in other examples, the method further comprises receiving push messages during the second period of the first mode. Additionally or alternatively to one or more examples disclosed above, in other examples, the first period of the first mode is spaced at periodic intervals. Additionally or alternatively to one or more examples disclosed above, in other examples, the method further comprises determining a number of push messages and a number of pull messages within a given time period. Additionally or alternatively to one or more examples disclosed above, in other examples, the method further comprises switching to the first mode when the number of pull messages is greater than the number of push messages. Additionally or alternatively to one or more examples disclosed above, in other examples, the method further comprises switching to the second mode when the number of push messages is greater than the number of pull messages. Additionally or alternatively to one or more examples disclosed above, in other examples, the method further comprises selecting between the first mode and second mode based on at least one of an application, a battery life, and an amount of noise associated with the communications link. Additionally or alternatively to one or more examples disclosed above, in other examples, the method further comprises determining whether an application is a red-list application; and selecting between the first mode and the second mode based on the determination. Additionally or alternatively to one or more examples disclosed above, in other examples, the processor dynamically switches modes when running a same application. Additionally or alternatively to one or more examples disclosed above, in other examples, the processor dynamically switches modes when a noise associated with the communications link exceeds a predetermined value.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A device comprising:
a transceiver configured to communicate through a communications link to a wireless access point; and
a processor configured to:
dynamically switch between at least a first mode of communication and a second mode of communication for communicating push messages and pull messages over the communications link, wherein each of the first and second modes of communication includes a first period and a second period;
receive data during the first period of the first mode of communication and switch to a first inactive state having a first base power level during the second period of the first mode of communication, the push messages being receivable at the first base power level in the first inactive state; and
retrieve data corresponding to a data request originating at the device during the first period of the second mode of communication and switch to a second inactive state having a second base power level, lower than the first base power level, during the second period of the second mode of communication, the push messages being unreceivable at the second base power level of the second inactive state.

2. The device of claim 1, wherein the transceiver is further configured to remain associated with the wireless access point during the first and second inactive states.

3. The device of claim 1, wherein the processor is further configured to:
switch to the first mode of communication for a communication of an application associated with instant delivery of messages; and
switch to the second mode of communication for a communication of an application associated with delayed delivery of messages.

4. The device of claim 1, wherein the processor is further configured to:
determine a number of push messages expected to be communicated to the transceiver over the communications link during a given time period and a number of pull messages expected to be communicated to the transceiver over the communications link during the given time period.

5. The device of claim 4, wherein the processor is further configured to:
switch to the first mode of communication when the number of pull messages expected to be communicated to the transceiver over the communications link during the given time period is greater than or equal to the number of push messages expected to be communicated to the transceiver over the communications link during the given time period.

6. The device of claim 5, wherein the processor is further configured to:
switch to the second mode of communication when the number of push messages expected to be communicated to the transceiver over the communications link during the given time period is greater than the number of pull messages expected to be communicated to the transceiver over the communications link during the given time period.

7. The device of claim 5, wherein the data retrieved during the first period of the second mode of communication includes one of the pull messages and one of the push messages that accompanies the one of the pull messages.

8. The device of claim 4 wherein the first base power level changes when an amount of noise associated with the communications link changes, the second base power level remains static when the amount of noise associated with the communications link changes, and the processor is further configured to:
dynamically switch between at least the first and second modes of communication based at least in part on the number of push messages expected to be communicated to the transceiver over the communications link during the given time period, the number of pull messages expected to be communicated to the transceiver over the communications link during the given time period, the first base power level expected for the given time period, and the second base power level expected for the given time period.

9. The device of claim 1, wherein the processor is further configured to:
receive data for the application during the first inactive state and
store the data in memory while remaining in the first inactive state when the application is the red-list application, otherwise dynamically switch to an active state.

10. The device of claim 1, wherein the processor is further configured to:
dynamically switch between the first and second modes of communication while communicating messages for application, wherein a first of the messages for the application is communicated via the first mode of communication and a second of the messages for the application is communicated via the second mode of communication.

11. A method comprising:
dynamically switching between a first mode of communication that is initiated by a server device and a second mode of communication that is initiated by a client device based at least in part on a number of push messages and a number of pull messages expected to be communicated to the client device during a given time period, each of the first and second modes of communication including a first period and a second period;
when the number of pull messages expected to be communicated to the client device during the given time period exceeds or equals the number of push messages expected to be communicated to the client device during the given time period, receiving data during the first period of the first mode of communication and switching to an inactive state during the second period of the first mode of communication; and
when the number of push messages expected to be communicated to the client device during the given time period exceeds the number of pull messages expected to be communicated to the client device during the given time period, retrieving data during the first period of the second mode of communication and switching to the inactive state during the second period of the second mode of communication.

12. The method of claim 11, further comprising maintaining association with a wireless access point during the inactive state.

13. The method of claim 11, further comprising:
switching to the first mode of communication for a communication of an application associated with instant delivery of messages; and
switching to the second mode of communication for a communication of an application associated with delayed delivery of messages.

14. The method of claim 11, further comprising:
switching to the first mode of communication when the number of pull messages expected to be communicated to the client device during the given time period is greater than or equal to the number of push messages expected to be communicated to the client device during the given time period.

15. The method of claim 14 further comprising: switching to the second mode of communication when the number of push messages expected to be communicated to the client device during the given time period is greater than the number of pull messages expected to be communicated to the client device during the given time period.

16. The method of claim 11, further comprising:
determining whether an application is a red-list application;
receiving data for the application during the inactive state; and
storing the data in memory while remaining in the inactive state, when the application is the red-list application, otherwise switching to an active state.

17. The method of claim 11, further comprising:
dynamically switching between the first and second modes of communication while communicating messages for an application, wherein a first of the messages for the application is communicated via the first mode of communication and a second of the messages for the application is communicated via the second mode of communication.

18. The method of claim 11, wherein the data is received or retrieved over a communications link and the method further comprises:
dynamically switching between the first and second modes of communication when an amount of noise associated with the communications link exceeds a predetermined value.

19. A device comprising:
a transceiver configured to communicate through a communications link to a wireless access point; and
a processor configured to:
determine a number of push messages for the device and a number of pull messages for the device within a given time period;
dynamically switch, for the communications link, between at least a first mode of communication and a second mode of communication based at least on the number of push messages and pull messages for the device within the given time period and distinct first and second base power levels associated with the first and second modes of communication, respectively, wherein each of the first and second modes of communication includes a first period and a second period;
receive data during the first period of the first mode of communication and switching to an inactive state during the second period of the first mode of communication; and
retrieve data corresponding to a data request originating at the device during the first period of the second mode of communication and switching to the inactive state during the second period of the second mode of communication.

20. The device of claim 19, wherein the processor is further configured to switch to the first mode of communication when the number of pull messages for the device is greater than the number of push messages for the device within the given time period.

21. The device of claim 20, wherein the number of push messages for the device and the number of pull messages for the device within the given time period are both greater than zero, and data received during the first period of the first mode of communication includes a push message and a pull message that accompanies the push message.

22. The device of claim 19, wherein the processor is further configured to switch to the second mode of communication when the number of push messages for the device is greater than the number of pull messages for the device, and the first base power level is greater than the second base power level, within the given time period.

23. The device of claim 22, wherein the data retrieved during the first period of the second mode of communication includes a pull message and a push message that accompanies the pull message.

* * * * *

UNITED STATES PATENT AND TRADEMARK OFFICE
CERTIFICATE OF CORRECTION

PATENT NO. : 10,743,255 B2
APPLICATION NO. : 14/341562
DATED : August 11, 2020
INVENTOR(S) : Ziv Wolkowicki et al.

It is certified that error appears in the above-identified patent and that said Letters Patent is hereby corrected as shown below:

In the Claims

Column 24, Line 19 (Claim 9), Add --determine whether an application is a red-list application;-- before "receive".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*